United States Patent [19]

Reed et al.

[11] 4,201,923
[45] May 6, 1980

[54] COMBINED CYCLE ELECTRIC POWER PLANT AND A GAS TURBINE HAVING IMPROVED MEGAWATT LOAD CONTROL

[75] Inventors: Terry J. Reed, North Huntingdon; Jack R. Smith, Pittsburgh, both of Pa.

[73] Assignee: Westinghouse Electric Corp., Pittsburgh, Pa.

[21] Appl. No.: 495,730

[22] Filed: Aug. 8, 1974

[51] Int. Cl.² ............................................. H02P 9/04
[52] U.S. Cl. .................................. 290/40 R; 364/494; 60/39.03; 60/39.28 R
[58] Field of Search .............. 290/40; 60/39.28, 39.03; 235/151.21; 264/492, 494, 495

[56] References Cited

U.S. PATENT DOCUMENTS

| | | | |
|---|---|---|---|
| 3,762,162 | 10/1973 | Miura et al. | 60/39.18 B |
| 3,866,109 | 2/1975 | Reed et al. | 290/40 |

Primary Examiner—Gene Z. Rubinson
Assistant Examiner—John W. Redman
Attorney, Agent, or Firm—E. F. Possessky

[57] ABSTRACT

A combined cycle electric power plant includes gas and steam turbines and steam generators and a digital-/analog control system. A gas turbine megawatt load control system is included in the control and it includes a feedforward load control which generates a fuel reference equal to the sum of a megawatt load demand and an idle speed fuel demand. The megawatt load control also includes a feedback load trimmer which provides minor corrective action on the operation of the feedforward load control. Gas turbine and combined cycle plant operation results in the generation of megawatts equal to an input demand value.

21 Claims, 41 Drawing Figures

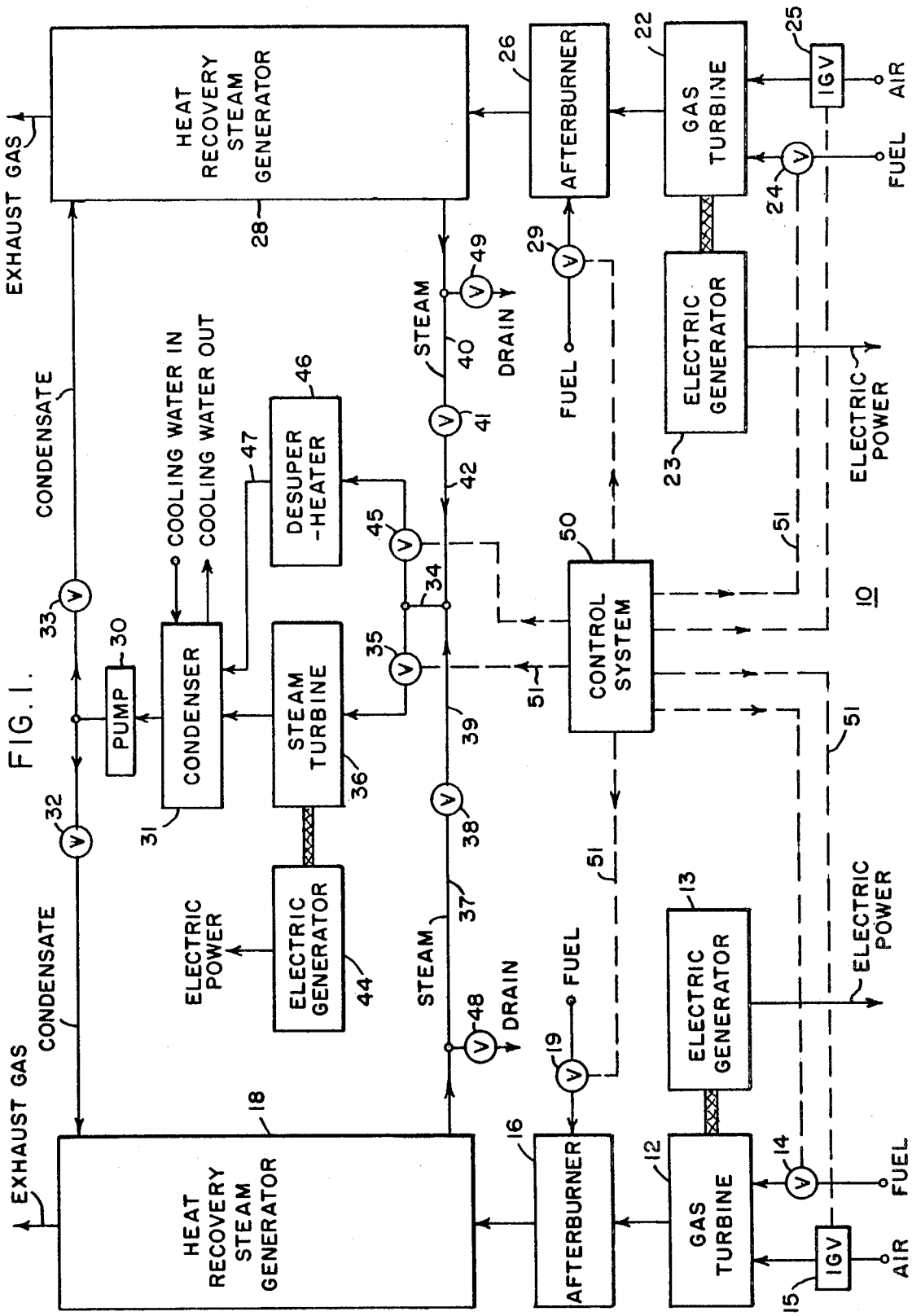
FIG. I.

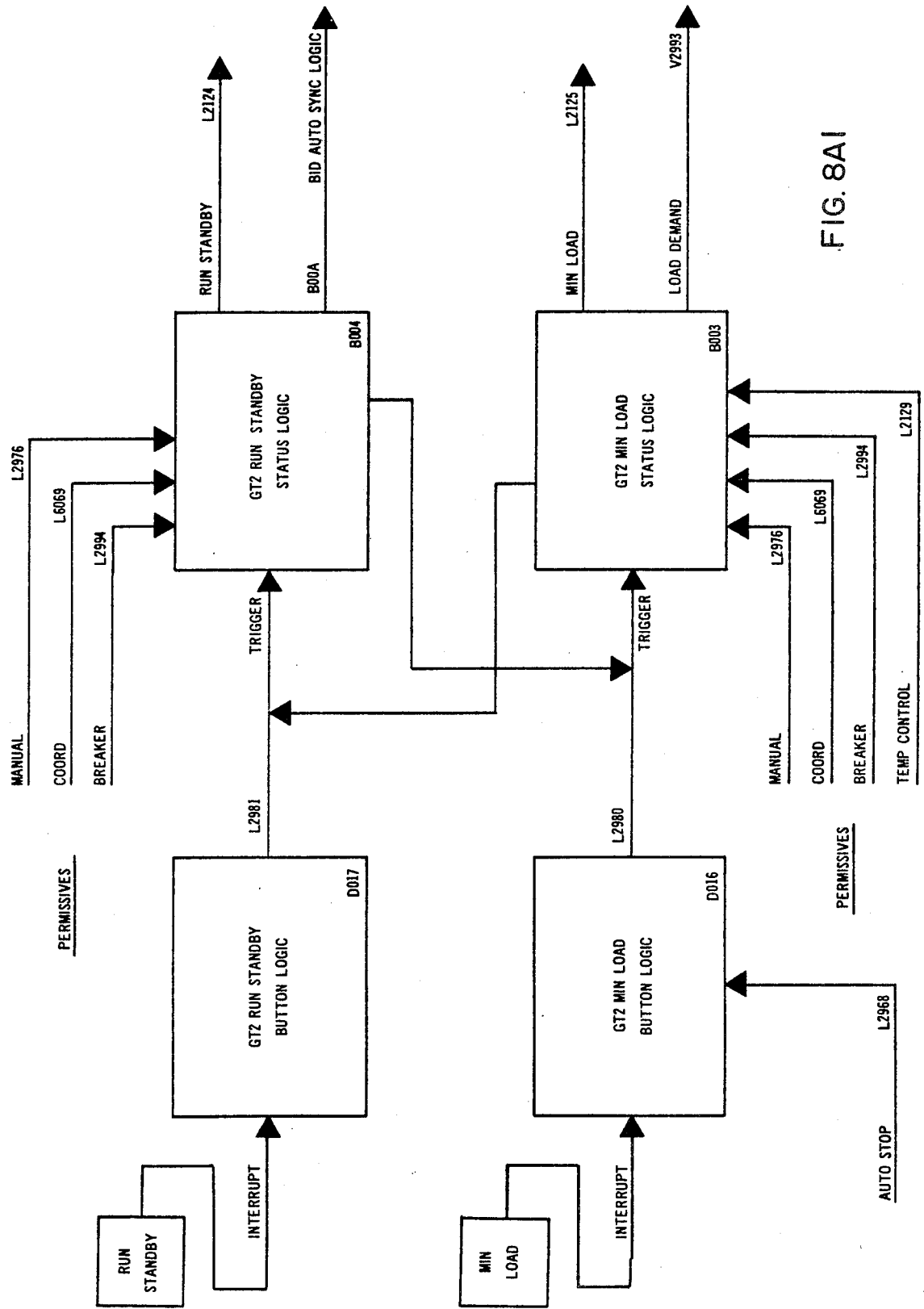
FIG. 8A1

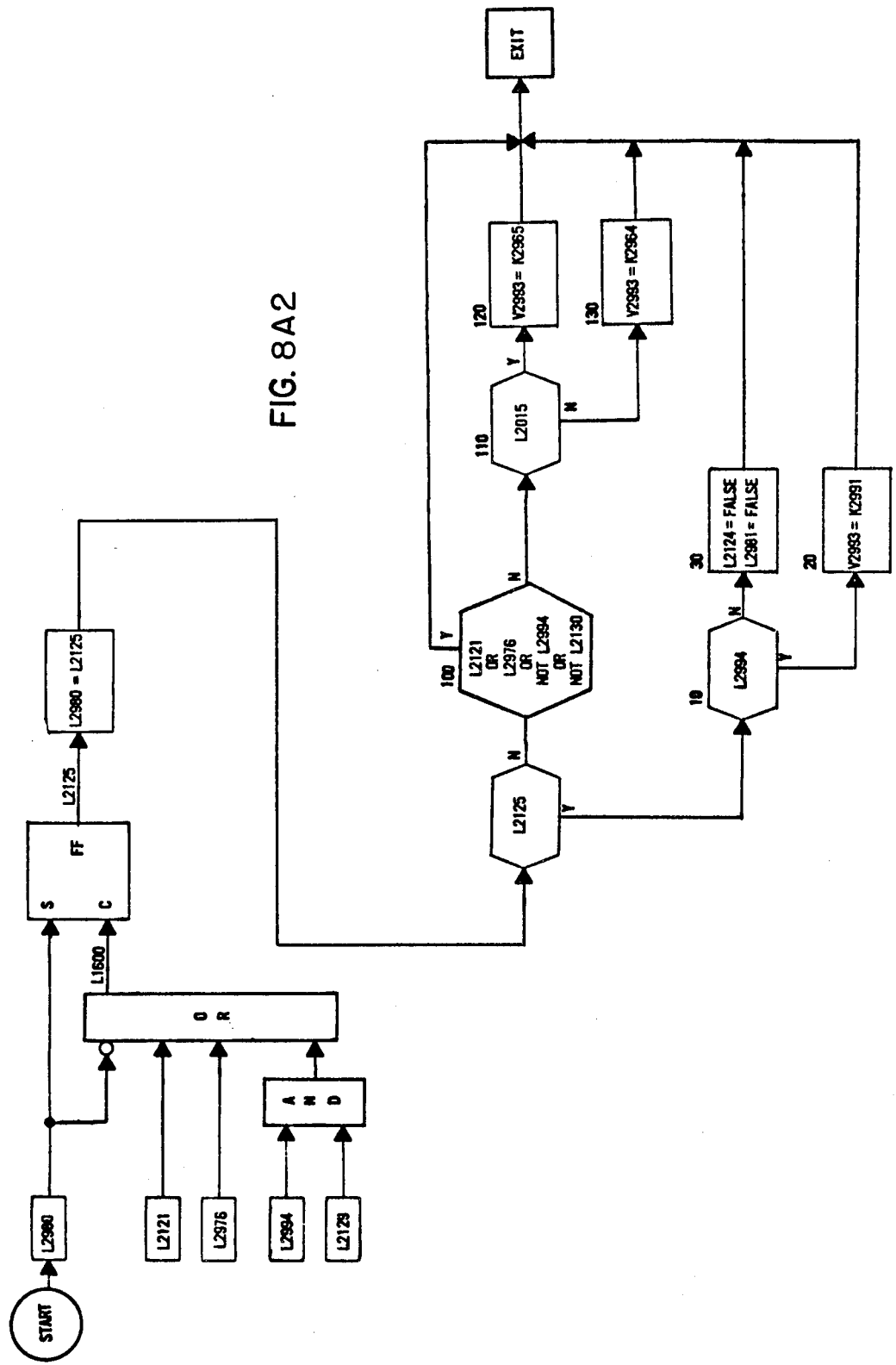
FIG. 8A2

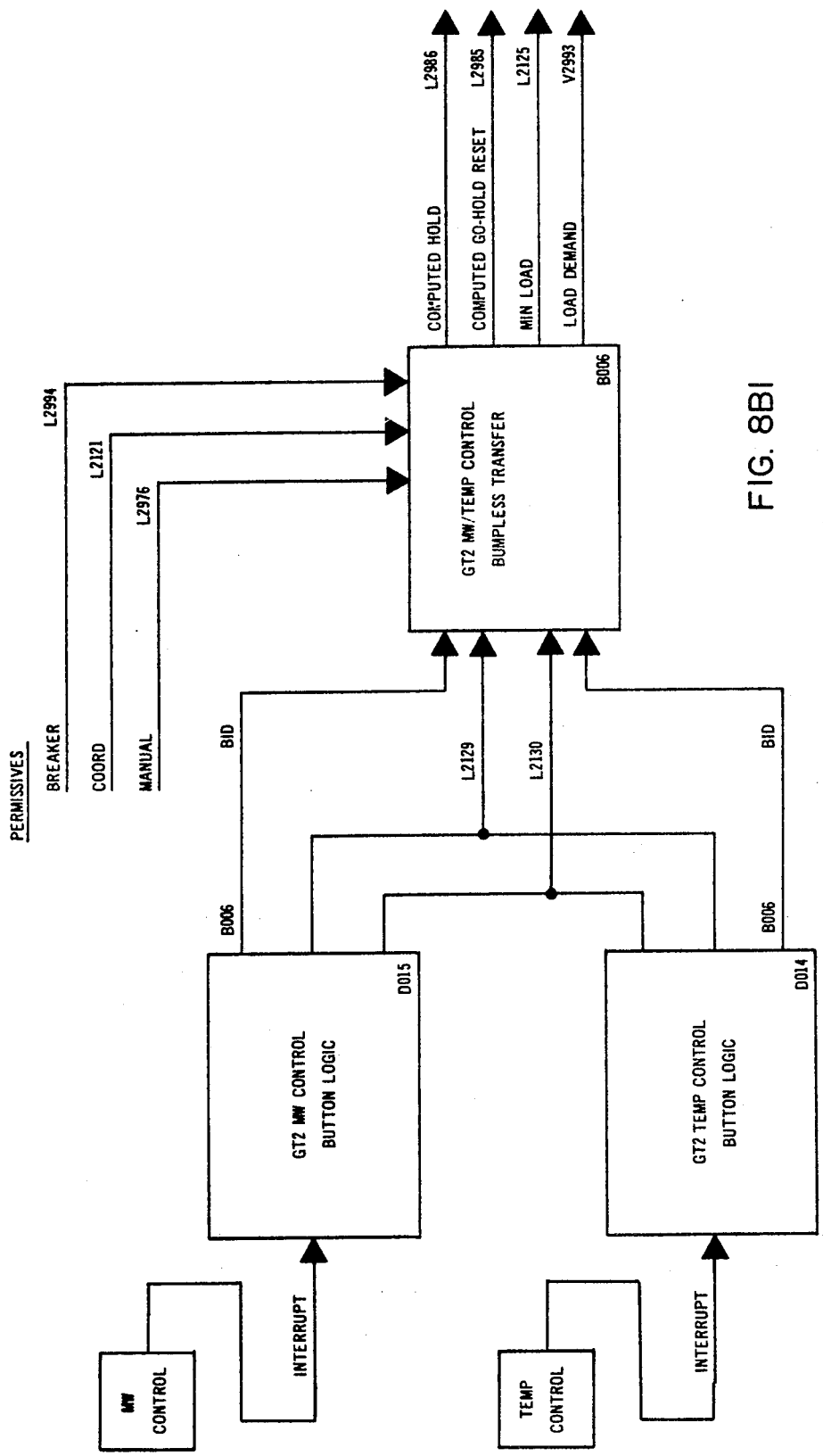
FIG. 8B1

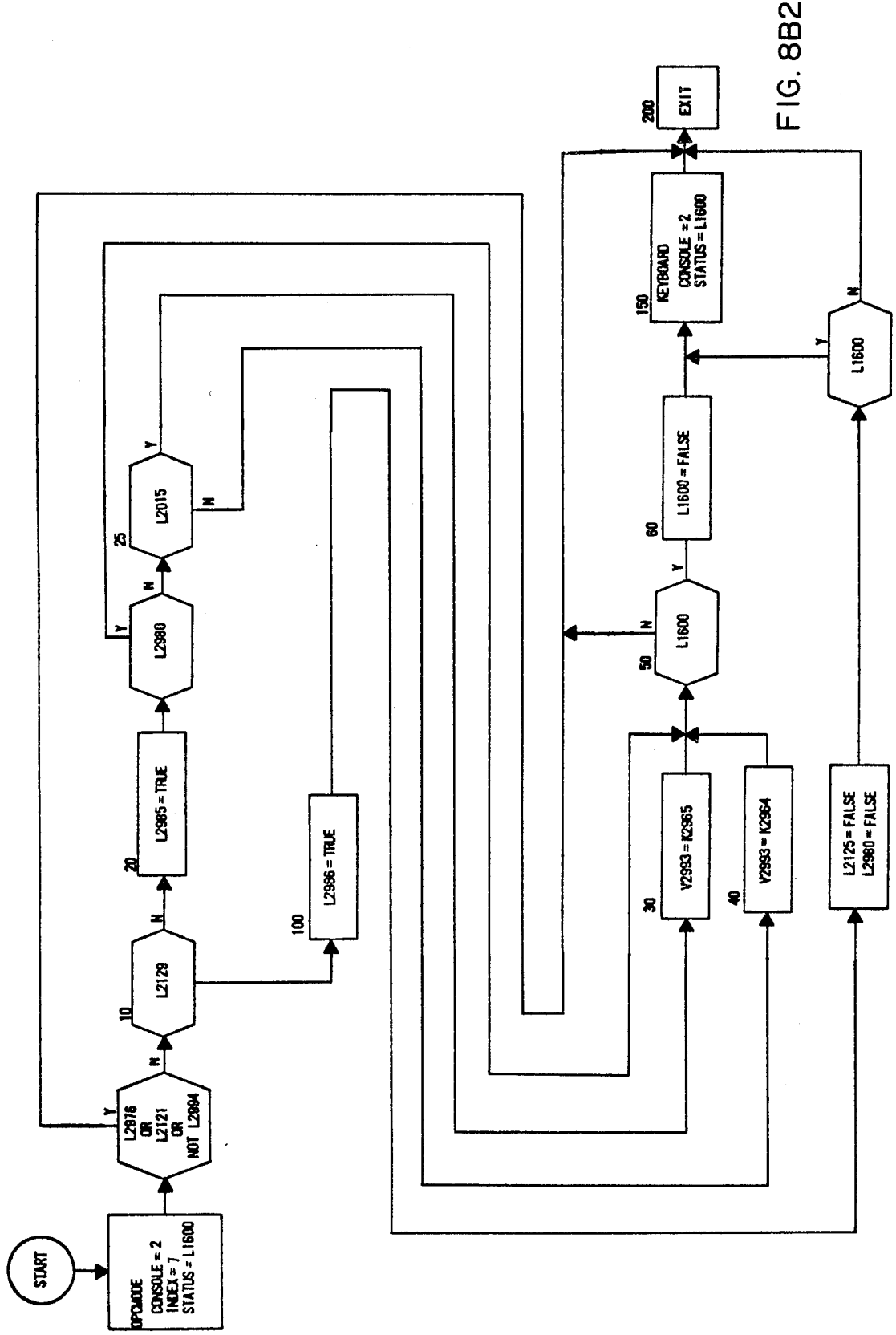
FIG. 8B2

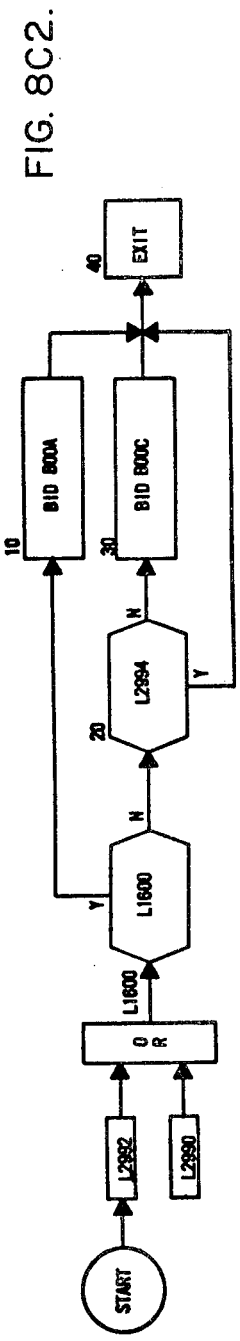

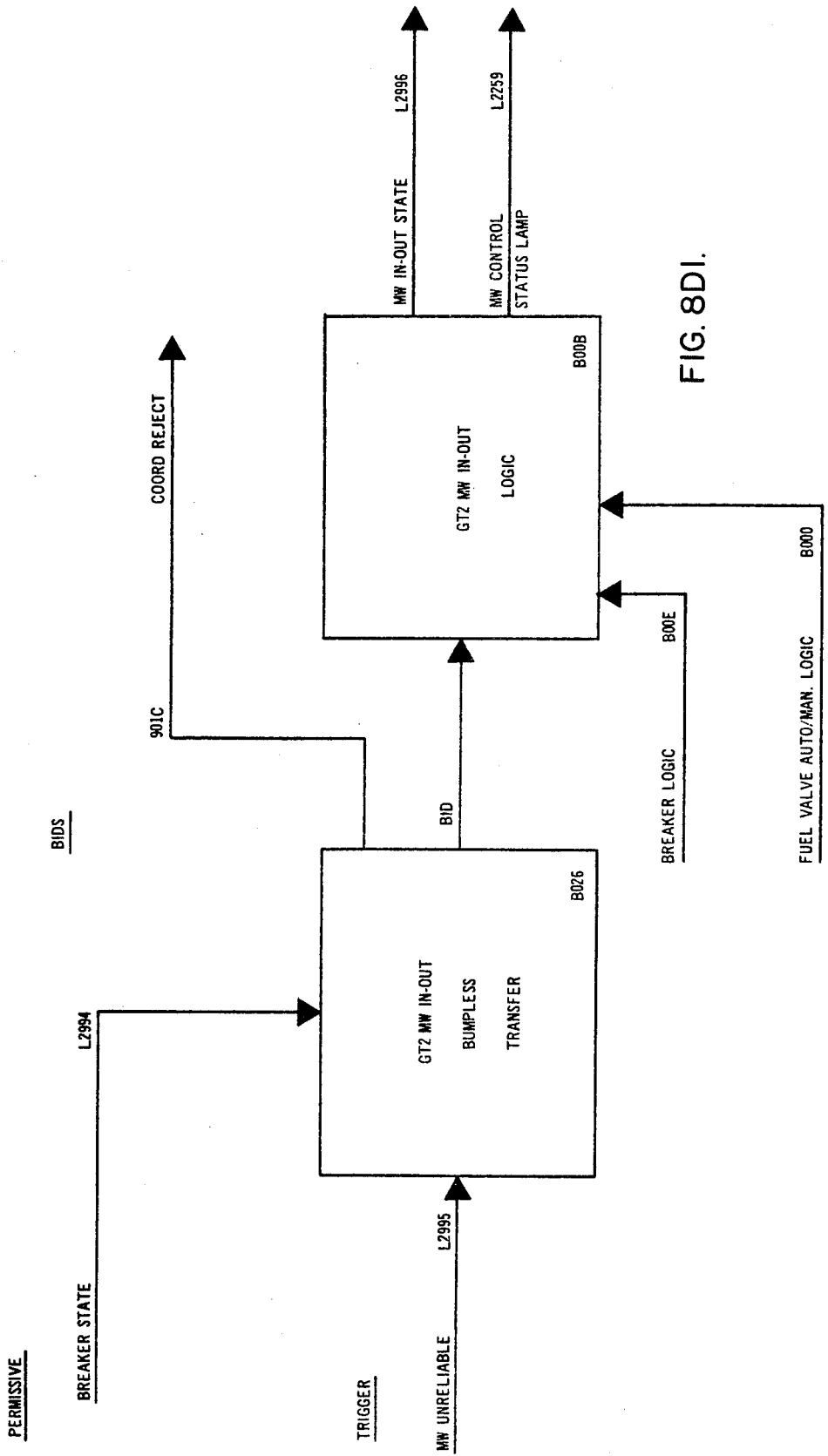
FIG. 8D1.

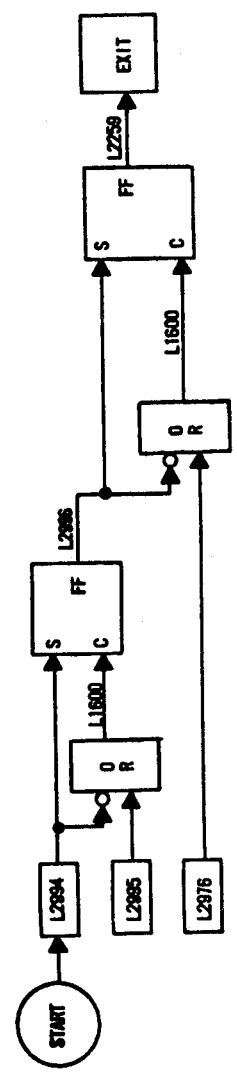
FIG. 8D2.

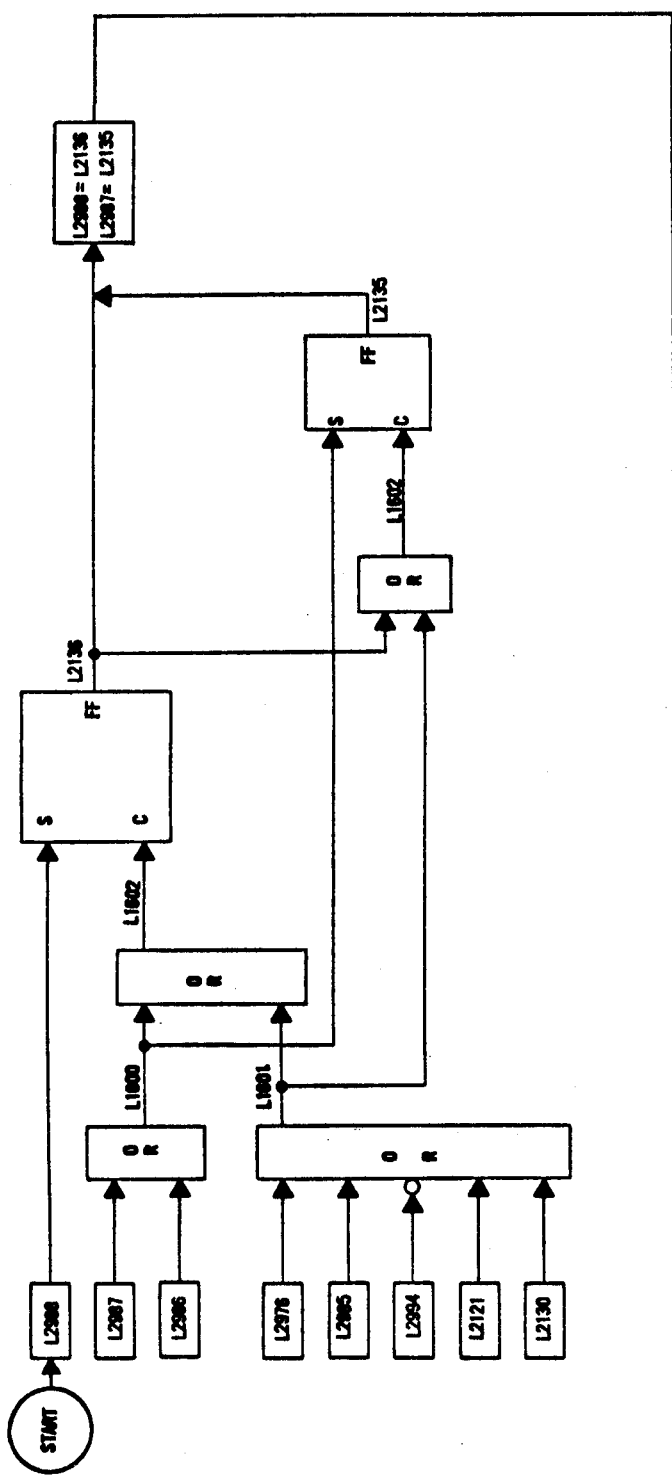
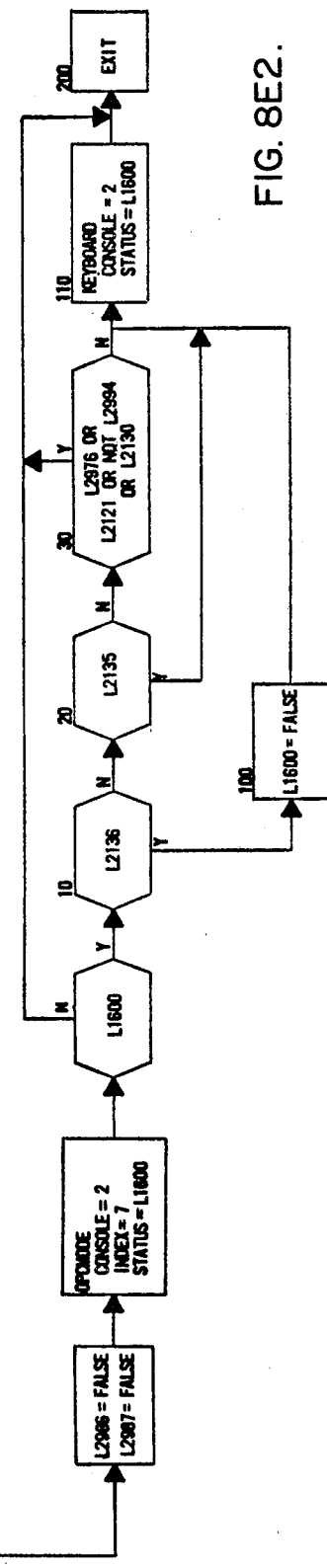
FIG. 8E2.

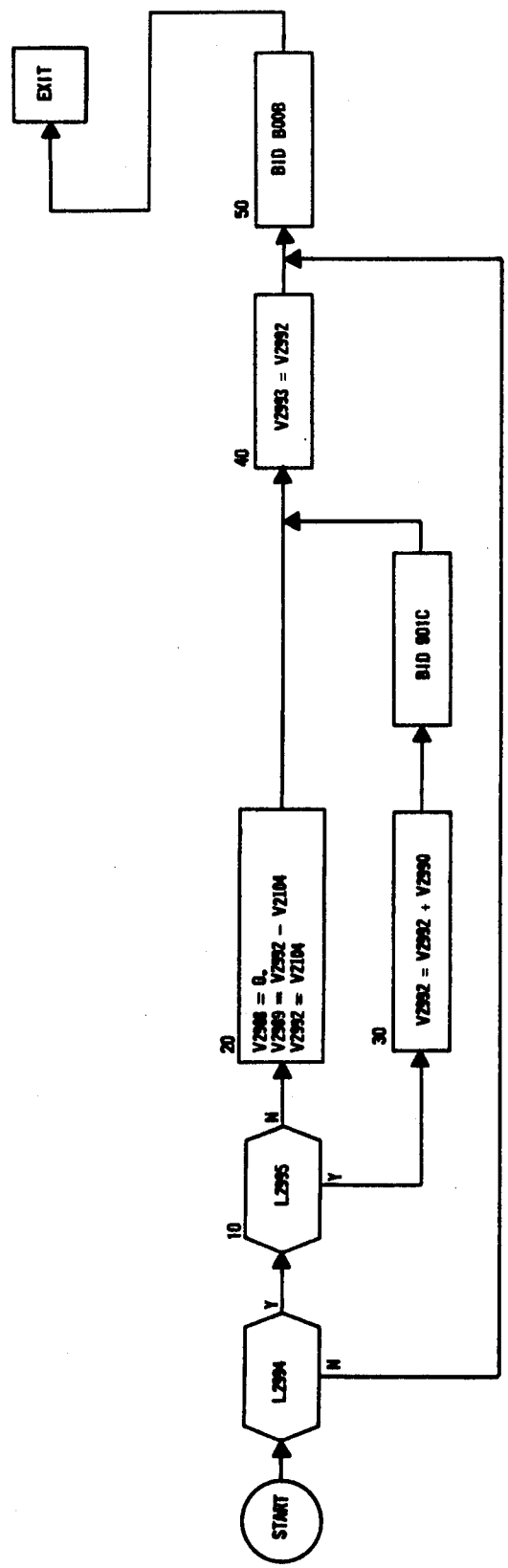
FIG. 8F2.

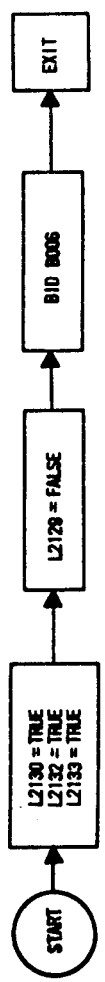
FIG. 8G2.

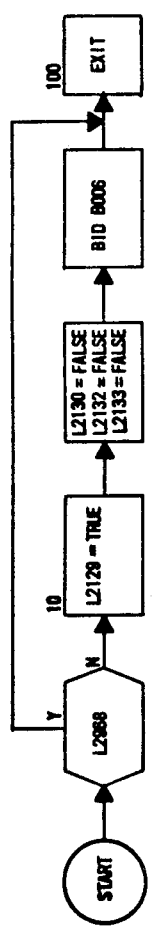
FIG. 8H2.

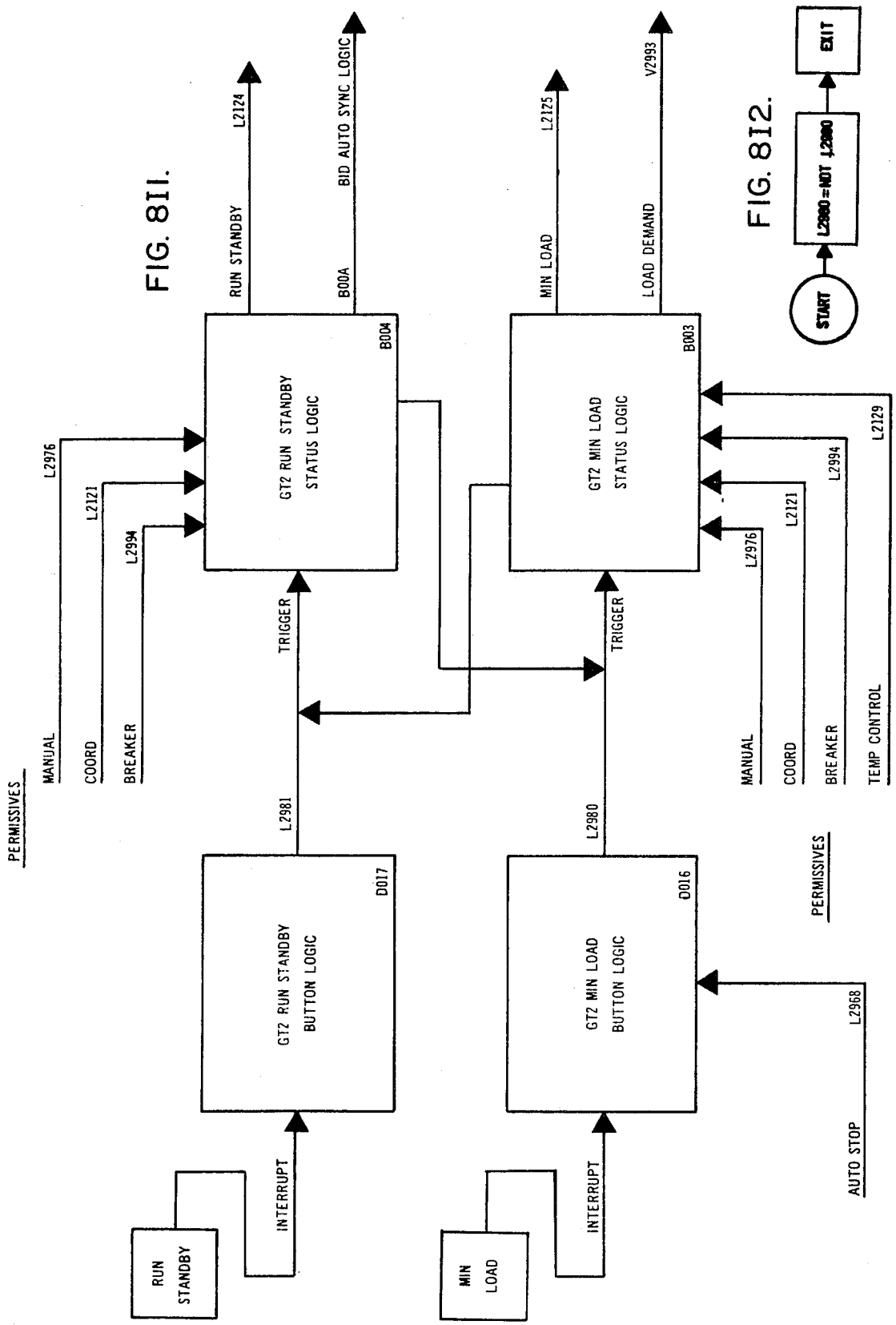

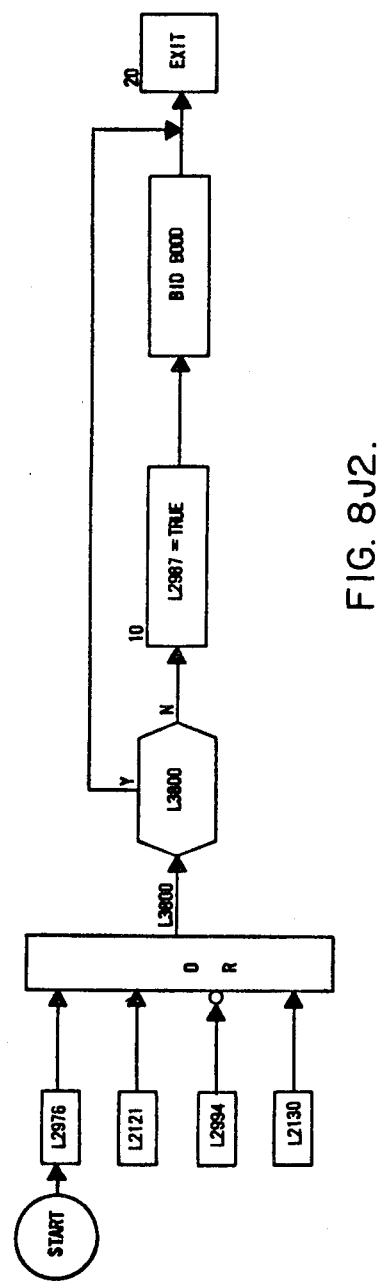
FIG. 8J2.

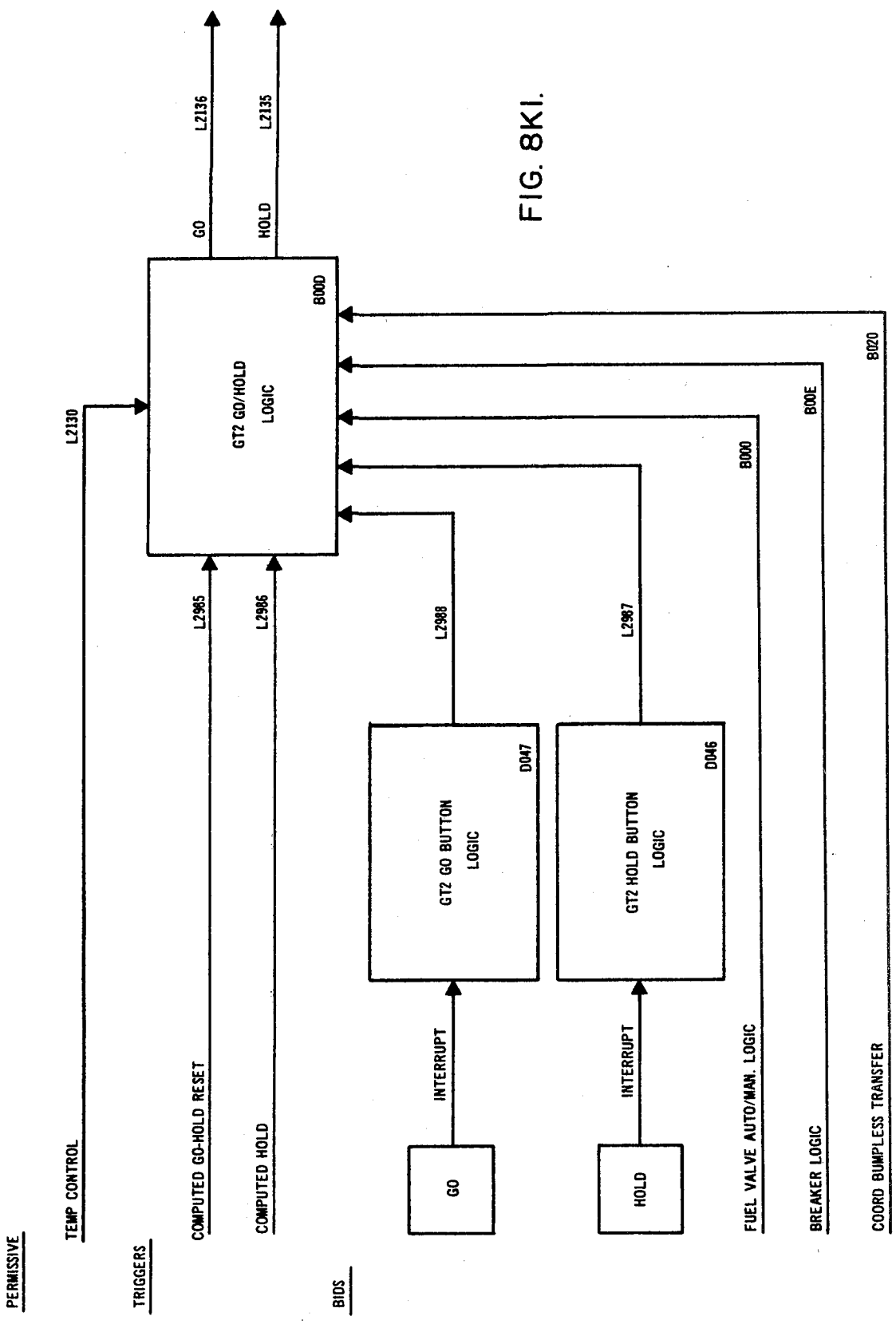

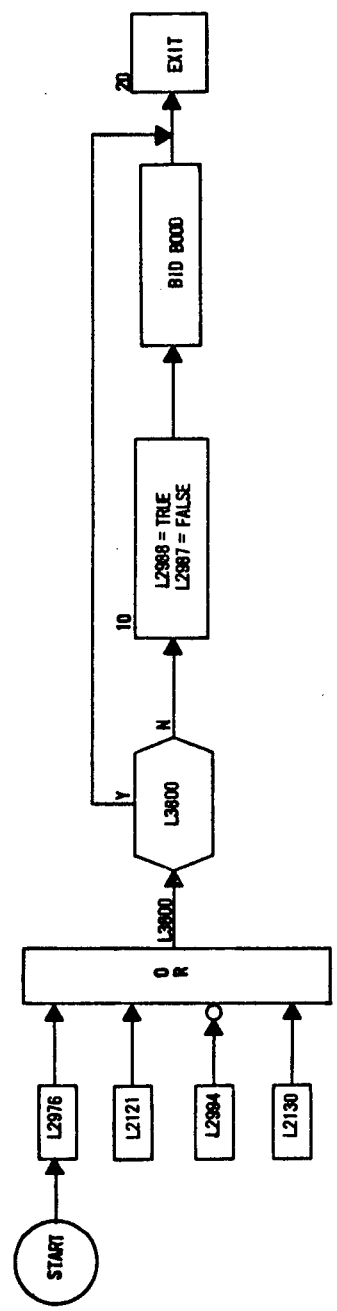
FIG. 8K2.

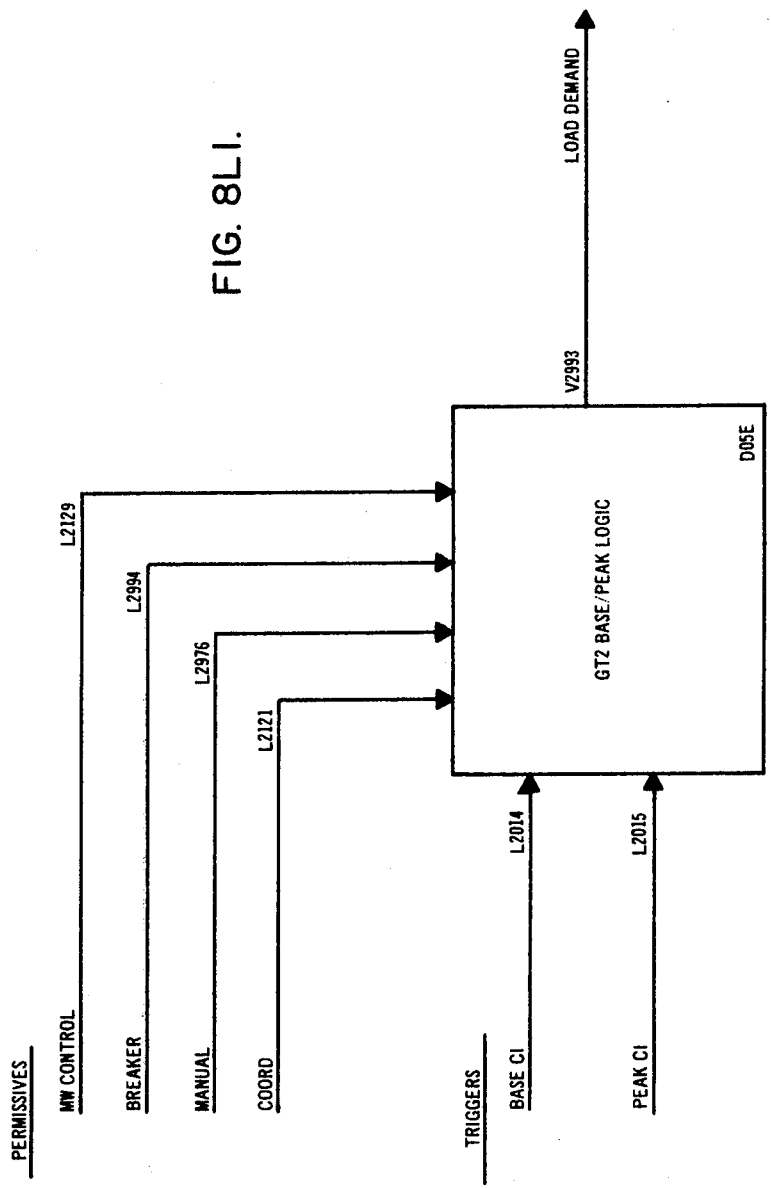
FIG. 8L1.

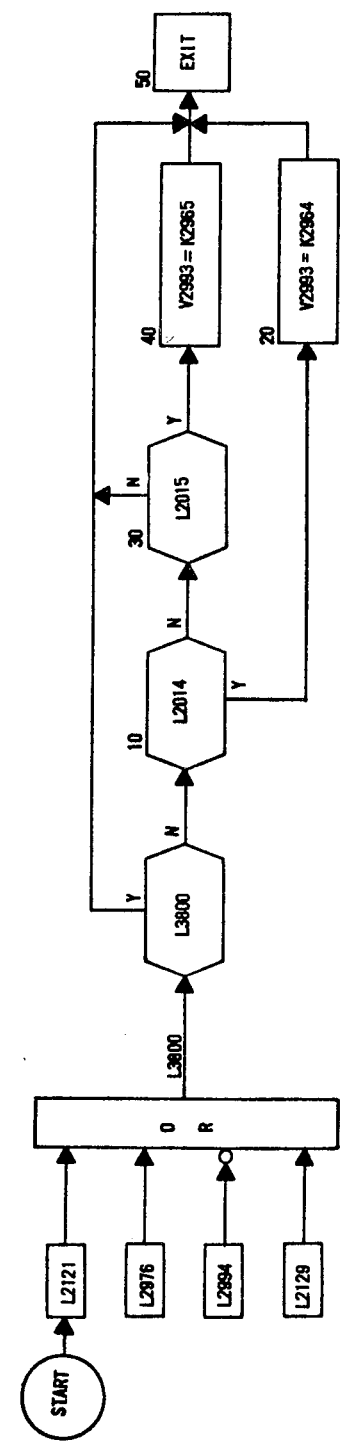
FIG. 8L2.

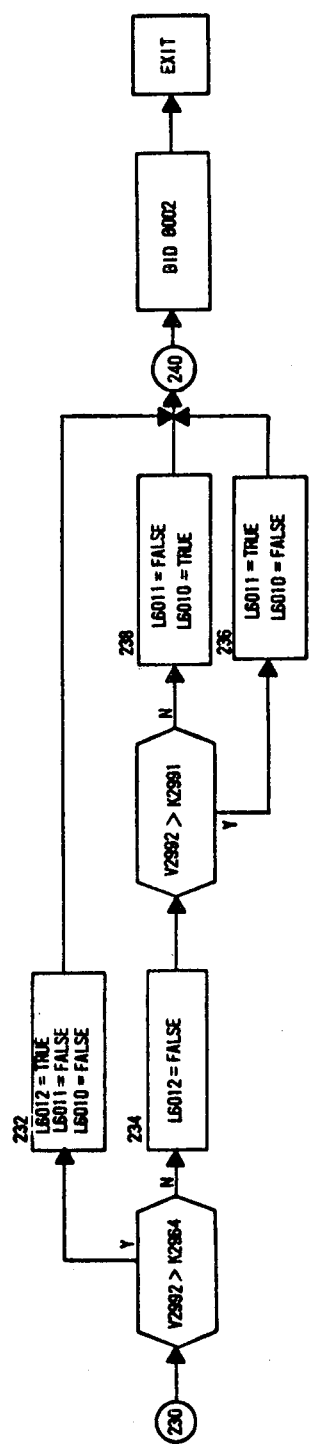
FIG. 9A2.

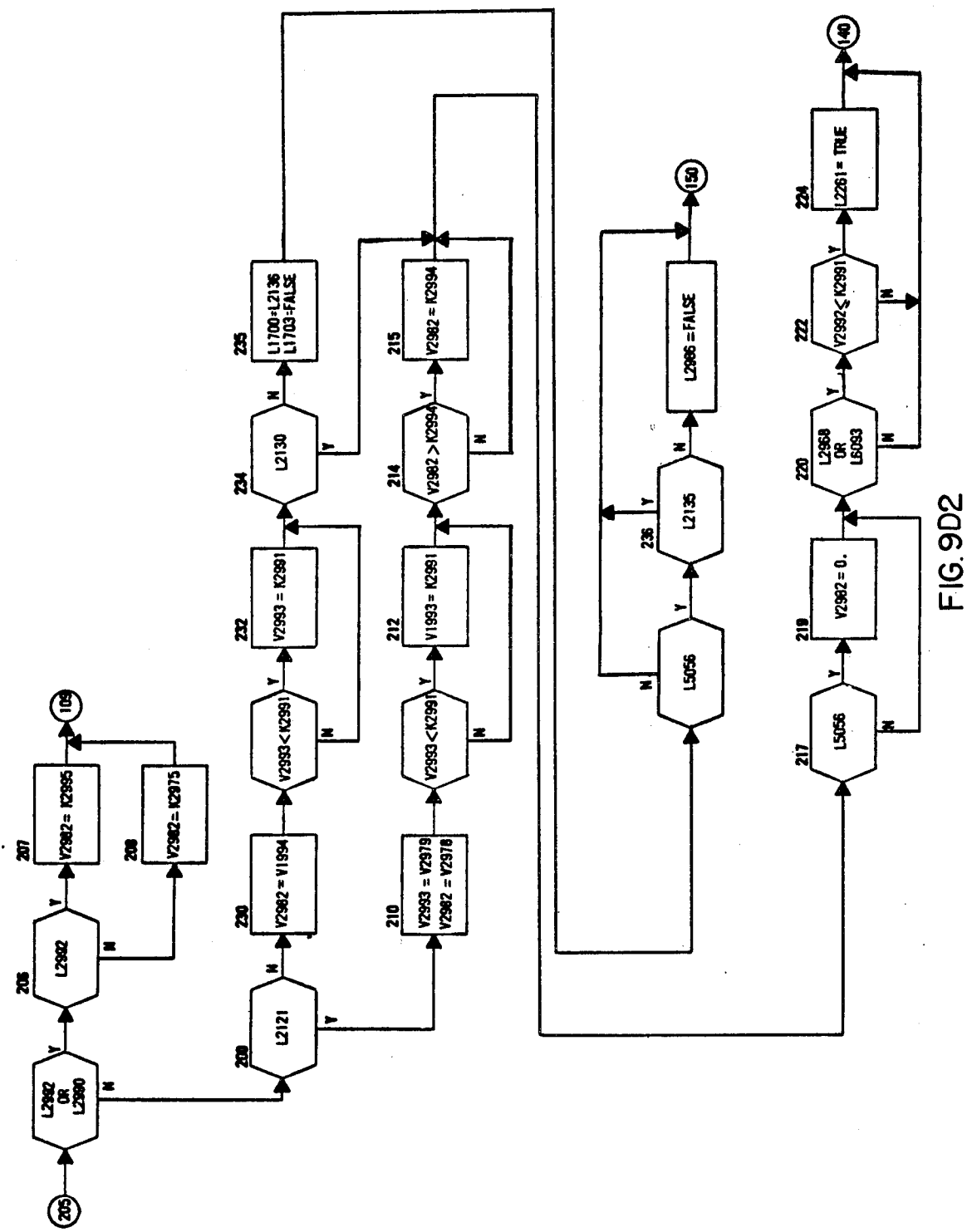
FIG.9D2

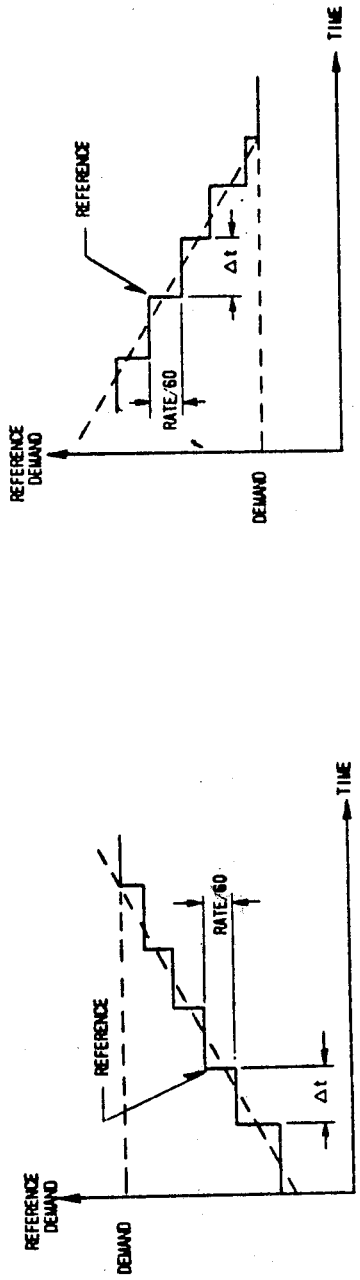
FIG. 9E1
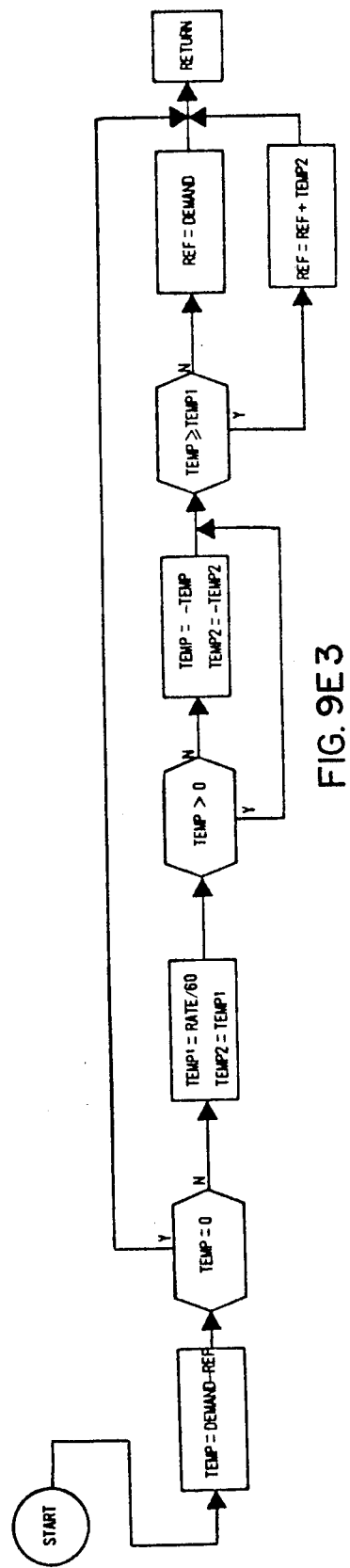
FIG. 9E2
FIG. 9E3

COMBINED CYCLE ELECTRIC POWER PLANT AND A GAS TURBINE HAVING IMPROVED MEGAWATT LOAD CONTROL

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine and Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,765, filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

5. Ser. No. 250,826 filed on May 5, 1972 by J. Gomola et al, entitled "A Digital Computer Monitored And/Or Operated System Or Process Which Is Structured For Operation With An Improved Automatic Programming Process And System", assigned to the present assignee and hereby incorporated by reference.

6. Ser. No. 495,727 filed concurrently herewith by Terry J. Reed and Jack R. Smith, entitled "Control Apparatus For Modulating The Inlet Guide Vanes Of A Gas Turbine Employed In A Combined Cycle Electric Power Generating Plant As A Function Of Load Or Inlet Blade Path Temperature", assigned to the present assignee and hereby incorporated by reference.

BACKGROUND OF THE INVENTION

The present invention relates to combined cycle electric power plants and more particularly to improved megawatt controls for combined cycle and other gas turbine electric power plants.

In the operation of electric power plants, it is generally desirable to provide megawatt load control for the operation of plant equipment to facilitate power system operations in meeting customer load demand. Such control has been provided for plants operated by steam turbines and associated control loop arrangements employed with them, for example as disclosed in a copending and co-assigned patent application Ser. No. 408,962 entitled "System And Method For Starting, Synchronizing And Operating A Steam Turbine With Digital Computer Control" filed as a continuation of an earlier filed patent application on Oct. 23, 1973 by T. Giras et al.

Where the prime mover for the electric power plant is a gas turbine, the purpose of the plant typically has been to provide peaking service and such turbines have accordingly typically been operated to provide maximum power output without megawatt control. However, load control has been provided for gas turbine electric power plants as disclosed in the above referenced patent application Ser. No. 319,114. That control is limited to achieving controlled load changes without the use of a megawatt correlated load reference, and accordingly without the capability for setting and automatically producing a megawatt demand.

With improved gas turbine heat rates and with the commercial acceptance of combined cycle electric power plants, the need for gas turbine load control in megawatts or other units of electric generation has increased. In applying megawatt control principles to gas turbine power plants, consideration must be given to the fact that the power required to drive the plant compressor changes with variations in ambient conditions and therefore the amount of generated electrical power similarly varies with changes in ambient conditions at any particular fuel flow setting. Thus, to achieve megawatt load control for a gas turbine electric power plant, it is necessary to apply megawatt control principles specifically to the gas turbine apparatus and associated control loop arrangements.

The description of prior art herein is made on good faith and no representation is made that any prior art considered is the best pertaining prior art nor that the interpretation placed on it is unrebuttable.

SUMMARY OF THE INVENTION

A combined cycle electric power plant includes gas and steam turbines and a control system having a gas turbine megawatt load control which preferably functions on a feedforward basis. The load control preferably generates a gas turbine fuel reference which comprises one variable portion having a variable value dependent upon the fuel required for idle operation and another portion which is generated by a load ramp generator at a predetermined rate of change toward an input megawatt demand value. Means are provided for correctively trimming the feedforward controller output.

BRIEF DESCRIPTION OF THE DRAWINGS

FIG. 1 shows a schematic view of a combined cycle electric power plant in which there is employed a gas turbine in accordance with the principles of the invention;

FIGS. 9A1 and 2, 9B, 9C, 9D1 and 2, 9E1 and 2 and 3 show flow charts for certain speed and load control chains employed in the computer.

DESCRIPTION OF THE PREFERRED EMBODIMENT

A. General Plant Description

Figure 2A:
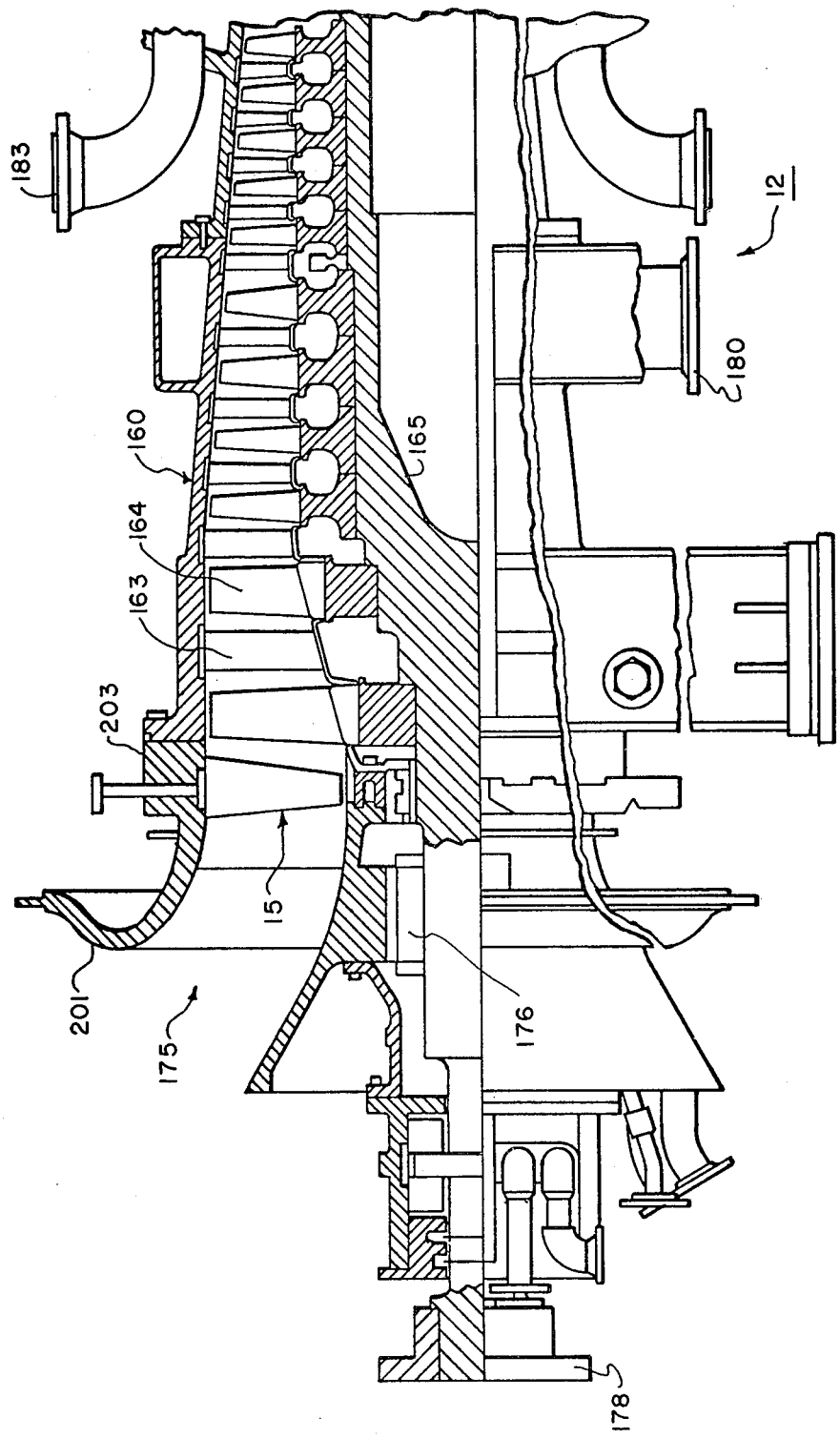
FIGS. 2A and 2B illustrate a gas turbine structure which can be employed in the plant of FIG. 1.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2B:
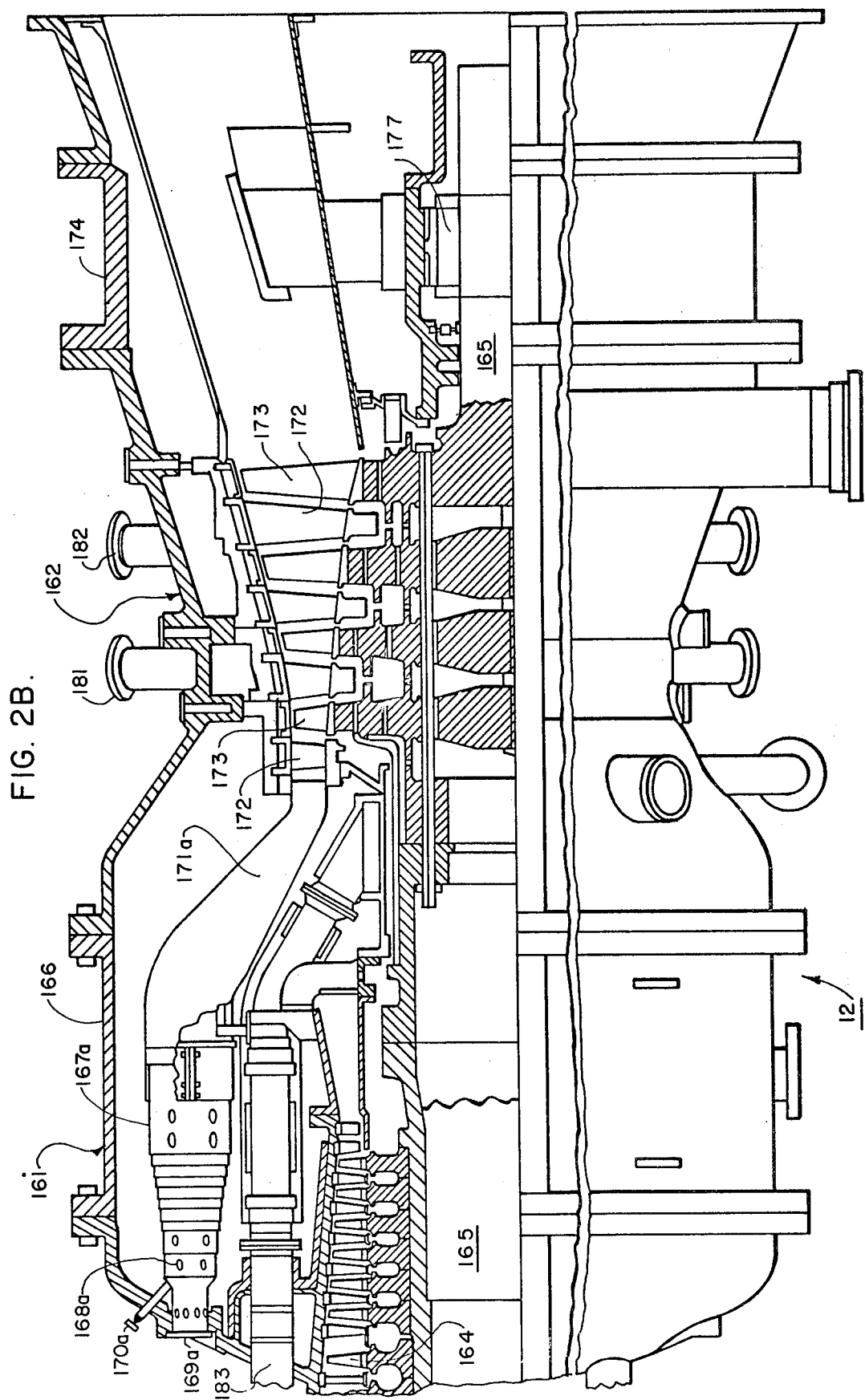

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a-167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a-167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765, (W.E. 44,522).

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
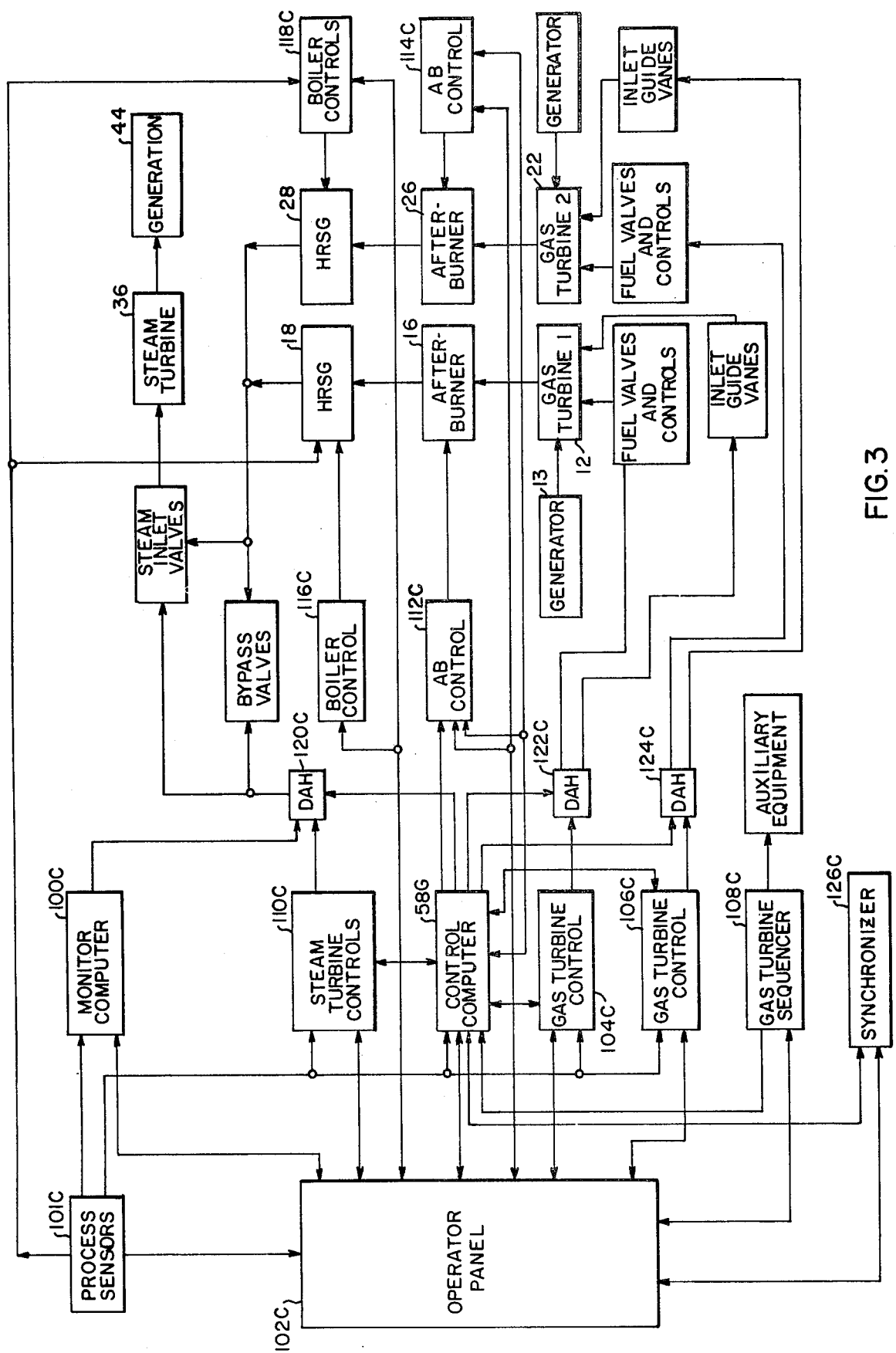
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Megawatt Load Control System For Gas Turbine

As shown in FIG. 4A, the preferred embodiment comprises a gas turbine megawatt load control system 400G which is included in the plant control system 50 to provide for gas turbine operation at a controlled megawatt level in response to a plant coordinated control setpoint, operator megawatt setpoint, or a remote digital dispatch megawatt setpoint. In coordinated control operation, gas turbine electrical load can accordingly be automatically and accurately controlled through control of the megawatt load generated by the operation of the gas turbines. In turn, with additional plant control, total plant electrical load is enabled to be controlled automatically and accurately. Further, in the operator automatic mode, the generated gas turbine load can be accurately set by an operator or by a remote setpoint to satisfy plant power dispatch requirements. In the latter case, turbine megawatt setpoint adjustments could be required to reach a particular dispatch plant power level according to the resultant steam turbine generated power which is combined with the gas turbine power to provide the total plant power.

The manual/automatic status of the plant control system 50 is fixed by operator selection at an operator panel 402G or by a computer rejection or failure to manual. A digital/analog hybrid interface 404G includes manual/automatic logic circuitry to detect when the gas turbine 12 is to be on manual control and to make bumpless switching operations which implement the applicable control mode.

In automatic control, a programmed digital control computer 58G generates a fuel reference from the hybrid interface 404G in the coordinated and the operator automatic modes to provide megawatt load control and to schedule fuel for automatic startup. It also initiates turbine startup by a sequencing system 406G under coordinated control. Generally, the sequencer 406G sequences the gas turbine 12 through the startup process by starting and stopping auxiliary equipment when sequencing permissives are generated, and it trips the turbine if certain conditions develop. Further, the sequencer 406G generates logicals for the turbine controls, i.e. a master relay on signal, a fuel on signal, a breaker status signal, a fuel select and transfer signal, and a flame on signal.

Megawatt control is provided only in the automatic modes of operation and it is not available to the operator in the backup modes. Generally, the megawatt level of gas turbine operation in the backup modes is that which results from the manual operation of a feedforward speed/load control through raise and lower pushbuttons. More detail on the back-up speed/load control is set forth in a copending and coassigned patent application Ser. No. 495693 entitled "A Combined Cycle Electric Power Plant And A Gas Turbine Having A Backup Control System With An Improved Feedforward Analog Speed/Load Control" and filed by J. Smith And T. Reed concurrently herewith.

With reference again to FIG. 4A, the operator controls the turbine loading operation in the backup mode by generating a fuel reference from the hybrid interface 404G through backup and limit controls 408G. The backup controls also include a simplified startup speed control which generates a feedforward fuel reference from the hybrid interface 404G during startup. Analog controls including over-speed and surge limiters function during the coordinated and operator automatic modes of operation as well as the operator analog and manual modes of operation.

An analog temperature limit control is included in the block 408G to function during the manual and operator analog modes as a limit on the fuel reference. The computer 58G provides a digital temperature limit control function 410G which acts as an override or a hold on the startup speed and load controls during the programmed computer operation in the automatic mode.

The hybrid interface 404G applies its output fuel reference to valve position control circuitry 412G which operates fuel valves 414G. As already indicated, the hybrid output fuel reference value is that value resulting from computer control or that value resulting from operator control from the control panel, subject to limit action. Transfer between automatic and manual fuel references is made bumplessly by the functioning of the hybrid interface 404G.

In the backup mode, the temperature limiter circuitry functions to limit bumplessly the fuel reference output signal from the hybrid interface 404G as required to prevent excessive blade path temperature and in turn excessive turbine inlet gas temperature. Surge and overspeed limit controls function in all modes of operation directly through the fuel valve positioning control 412G to limit the fuel demand reference for the purpose of avoiding surge operating conditions and turbine overspeed.

Figure 4:
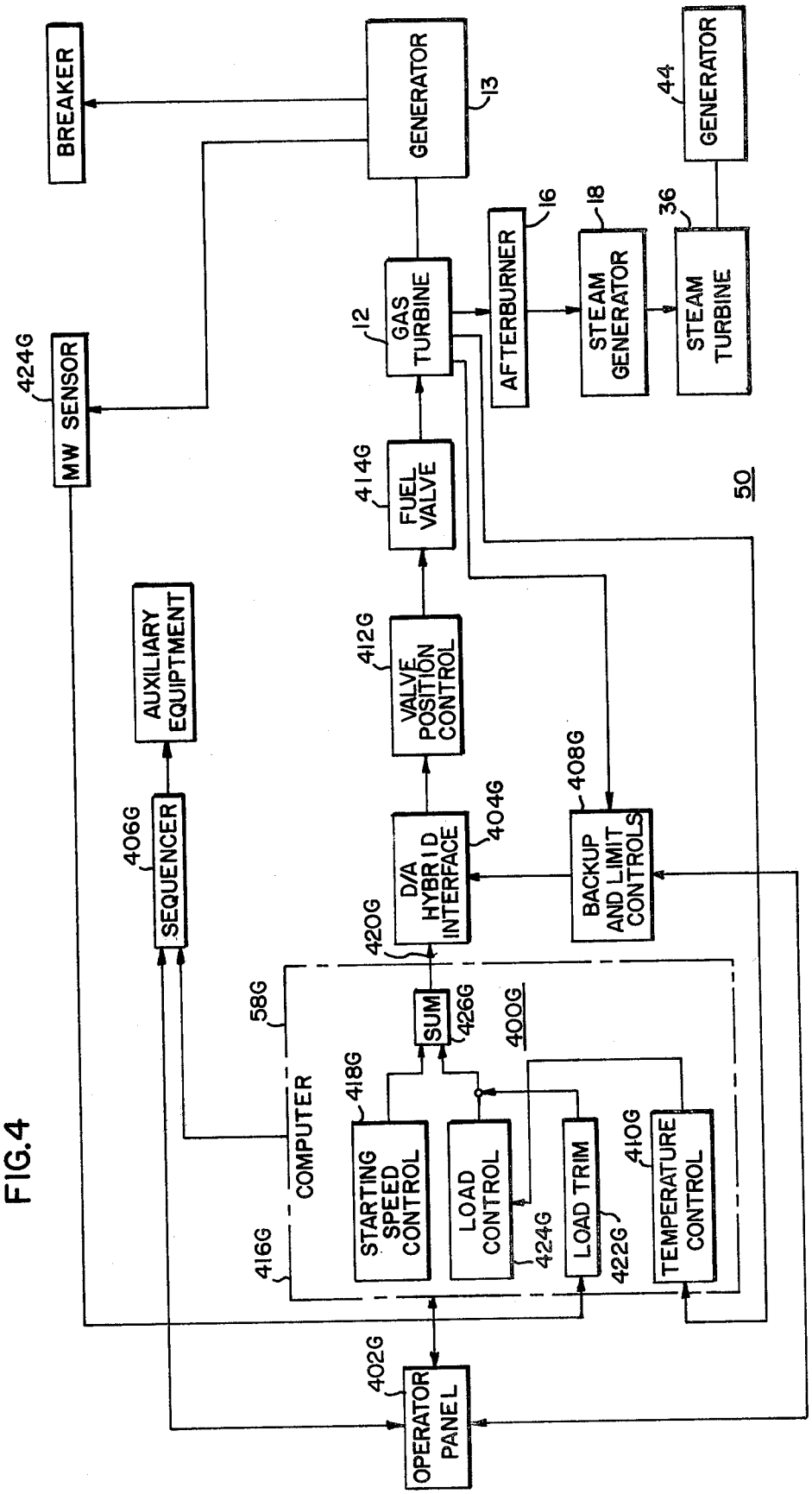
FIG. 4 shows a schematic diagram of the plant control system with elements of a megawatt load control loop illustrated to indicate more particularly the preferred manner of embodying the invention.
Figure 7:
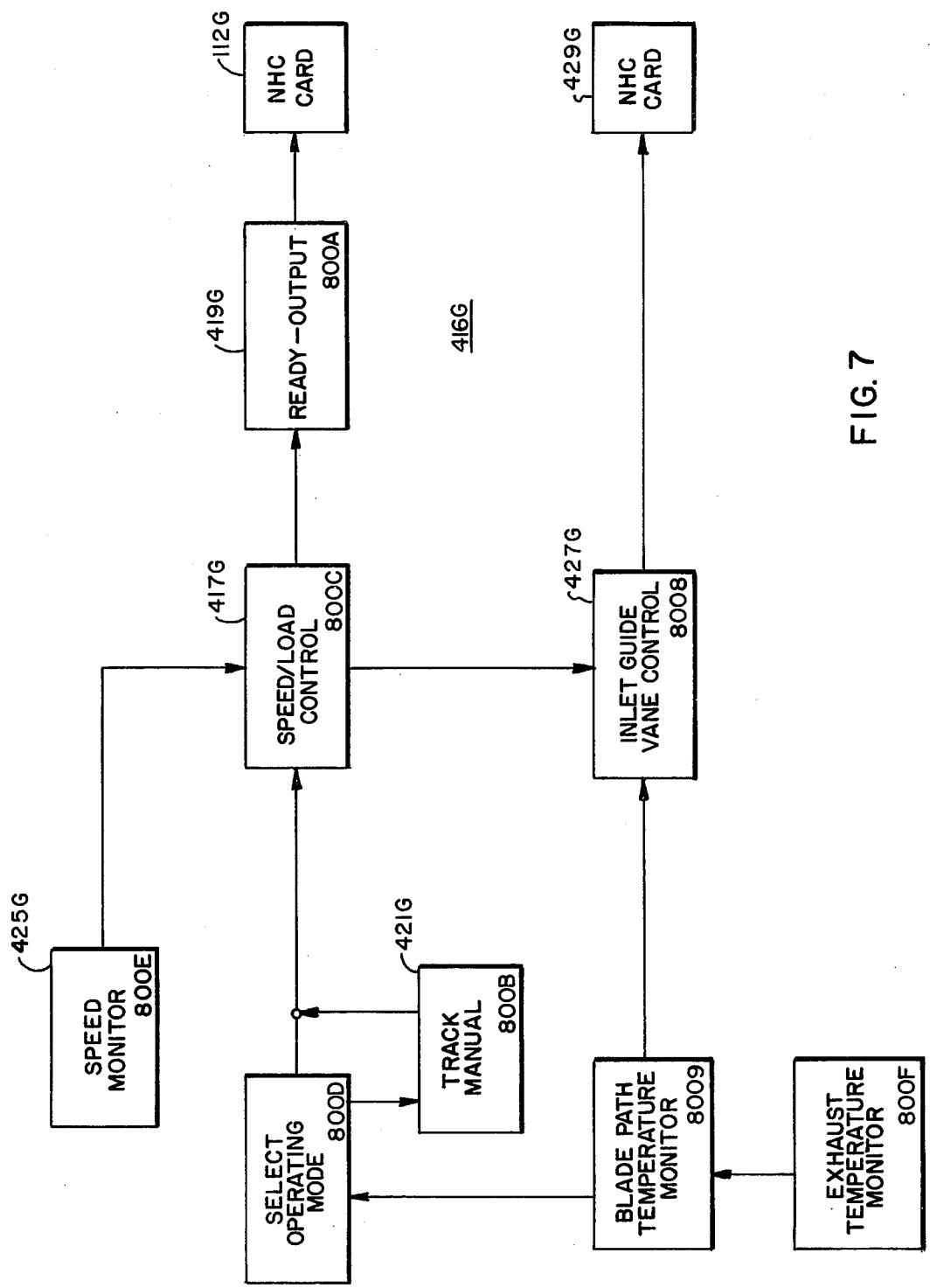
FIG. 7 shows a schematic diagram of a digital fuel control system which provides part of the load control loop.

As shown in FIGS. 4 and 7, a digital fuel control 416G operates automatically and it includes the computer 58G and embodies certain elements in the megawatt load control system 400G, a system 410G for limiting blade path temperature, and a startup speed control system 418G. The megawatt load control system 400G and the startup speed control system 418G together form an automatic speed/load control system 417G (FIG. 4B) which generates a fuel reference through an output block 419G as indicated by the reference character 420G. In backup control operation, a block 421G tracks the computer fuel reference output to the hybrid interface output, i.e. the output of a fuel control NHC card 112G. In the automatic load mode, an inlet guide vane control 427G operates through another NHC card 429G and improves the plant efficiency as set forth more particularly in a copending and coassigned patent application Ser. No. 495,727 entitled "Control Apparatus For Modulating The Inlet Guide Vanes Of A Gas Turbine Employed In A Combined Cycle Electric Power Generating Plant As A Function Of Load Or Inlet Blade Path Temperature", and filed by Terry J. Reed and Jack R. Smith concurrently herewith.

The load control system 400G preferably functions as a feedforward generator, and a megawatt trim control 422G preferably provides a megawatt feedback trim correction to the forward load control channel on the basis of actual megawatts generated by a sensor 424G. The startup speed control 418G preferably functions as a closed loop speed feedback control with the setpoint being varied in accordance with a speed/time characteristic and in accordance with hold and runback actions which may occur during the startup. Speed error is equal to the difference between the reference and a speed feedback from a monitor 425G and it is used as an input to a proportional plus integral controller which generates the fuel reference as a function of time.

With reference now to the startup speed control system 418G, gas turbine startup in the automatic mode is controlled from an ignition speed of approximately 900 rpm to synchronous speed. At ignition, the fuel reference is set at a fixed value and upon detection of a successful ignition the speed reference is increased to generate an increasing output reference for the fuel control. When the fuel reference from the speed loop equals the minimum fuel allowed for acceleration by a downstream low limiter, the speed loop becomes controlling. The fuel reference then increases normally in accordance with the stored speed/time characteristic. The speed control is arranged normally to make the gas turbine accelerate to synchronous speed in the same length of time from startup to startup. Reference is made to the above referenced patent application Ser. No. 399,790 for more description of the startup speed control.

At the end of the acceleration period, the gas turbine is in a run standby state at a speed of approximately 3,600 rpm and it is ready to be synchronized. The synchronizing procedure can be initiated by the operator, or in the coordinated control mode the procedure is automatically initiated. The fuel reference which exists at the time that the gas turbine reaches the run standby state is stored for subsequent use since the run standby fuel requirement varies in dependence on ambient temperature and to some extent on other variable conditions.

Generally, once a demand is applied to a load control 424G in the megawatt load control system 400G, the fuel reference is ramped from its present value toward the demand value at a specified rate. The rate can be inserted by the operator or changed dynamically by limit controls. During the time period when the fuel reference is to be ramped toward the demand value, it can be put into a HOLD state where the fuel reference value remains fixed until a GO signal is generated at which time the ramping of the fuel reference toward the demand value is resumed.

The fuel reference can also be increased or decreased as requested by external sources including an automatic synchronizer and an automatic dispatch system. The fuel reference can be adjusted to some lower value by a runback request. The computer output fuel reference is tracked to the hybrid output fuel reference when the system is operating in a backup mode to provide for a bumpless transfer.

In the operation of the megawatt load control system 400G, the load reference is proportional to megawatts and becomes a feedforward demand for fuel valve position after conversion from megawatts to valve position and correction by the megawatt feedback trim from the load trim control 422G. Temperature and other override signals hold or run back the load reference to provide protective system responses to abnormal conditions, to reduce control signal transfers and to prevent integrator windup.

Figure 5:
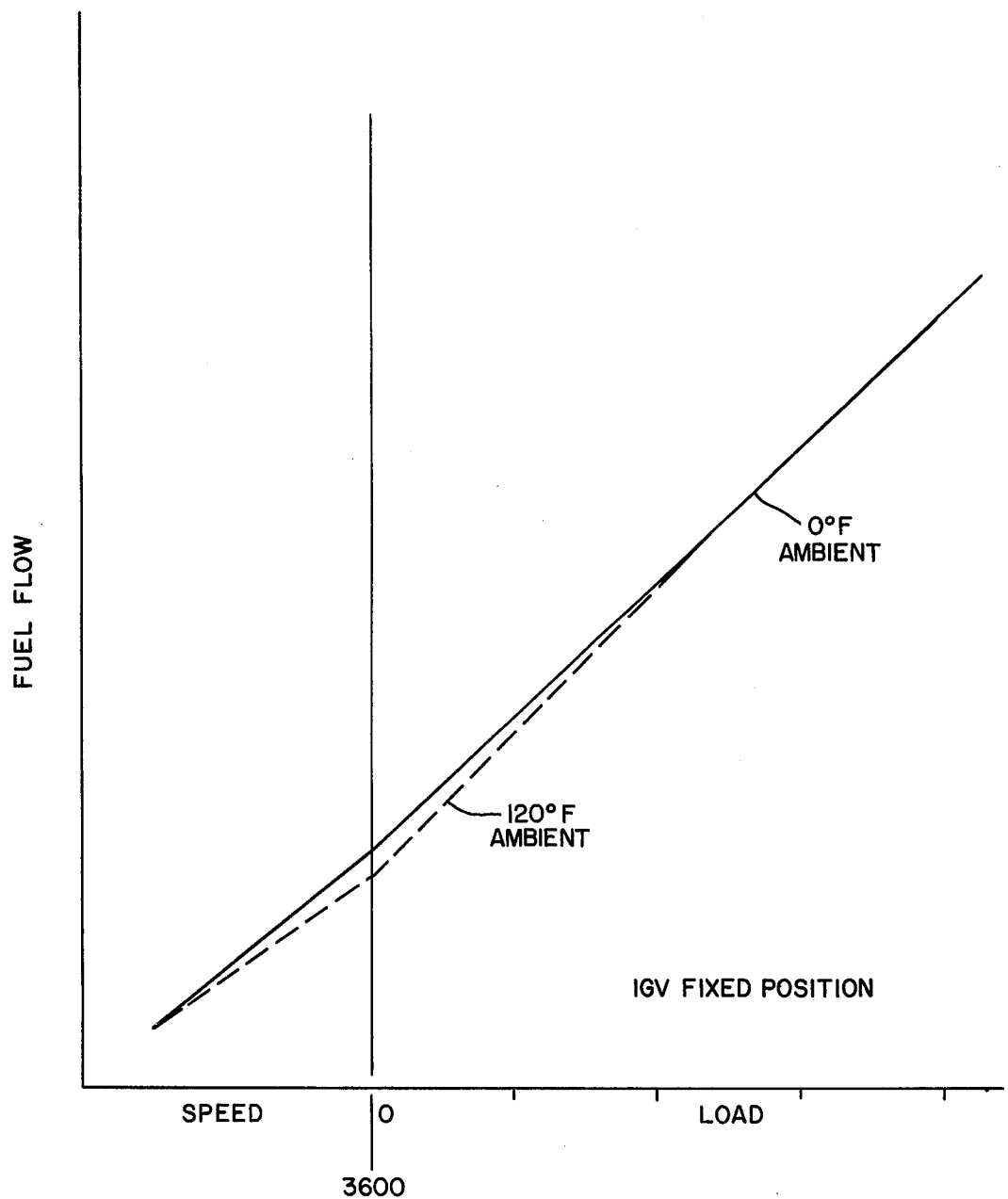
FIG. 5 shows a graphical representation of the manner in which load varies as a function of fuel flow under varying ambient temperature conditions.

A summer 426G generates the computer output fuel reference 420G as the sum of a load fuel reference plus the stored run standby or idle speed fuel reference. The system is calibrated so that the load demand is satisfied by the sum of the load fuel reference and the idle fuel reference, and accordingly the actual generated load can be quickly and accurately controlled without control system delay even though ambient conditions may vary over a period of time. Some inaccuracy can creep into the feedforward load control if the plant has been operating continuously for a long period of time and the average ambient temperature has changed significantly over that time period. However, with frequent plant starts such as more than once a week, such inaccuracy is limited to cases of short term transient ambient temperature conditions. In any case, the load trim control corrects for megawatt errors including those induced by changed ambient temperature with some control system delay time. FIG. 5 illustrates how gas turbine generated load varies with fuel flow for differing ambient temperatures.

If the breaker opens while operating in the load mode, the load reference is made equal to zero and the fuel reference applied by the computer 58G to the hybrid interface 404G is made equal to the stored idle fuel reference. Further, the output of the load trim 422G is made equal to zero so that it does not cause any disturbance to the speed control.

With the breaker closed, accurate megawatt control is provided by the functioning of the megawatt load control system 400G. Operator load demands or automatically generated load demands are quickly and accurately satisfied by the feedforward operation of the megawatt load control system 400G in adjusting the load level of operation of the gas turbine 12. The load trim 422G provides any minor corrections needed in the functioning of the megawatt load control system 400G.

SYSTEM FUNCTIONS

Figure 6:
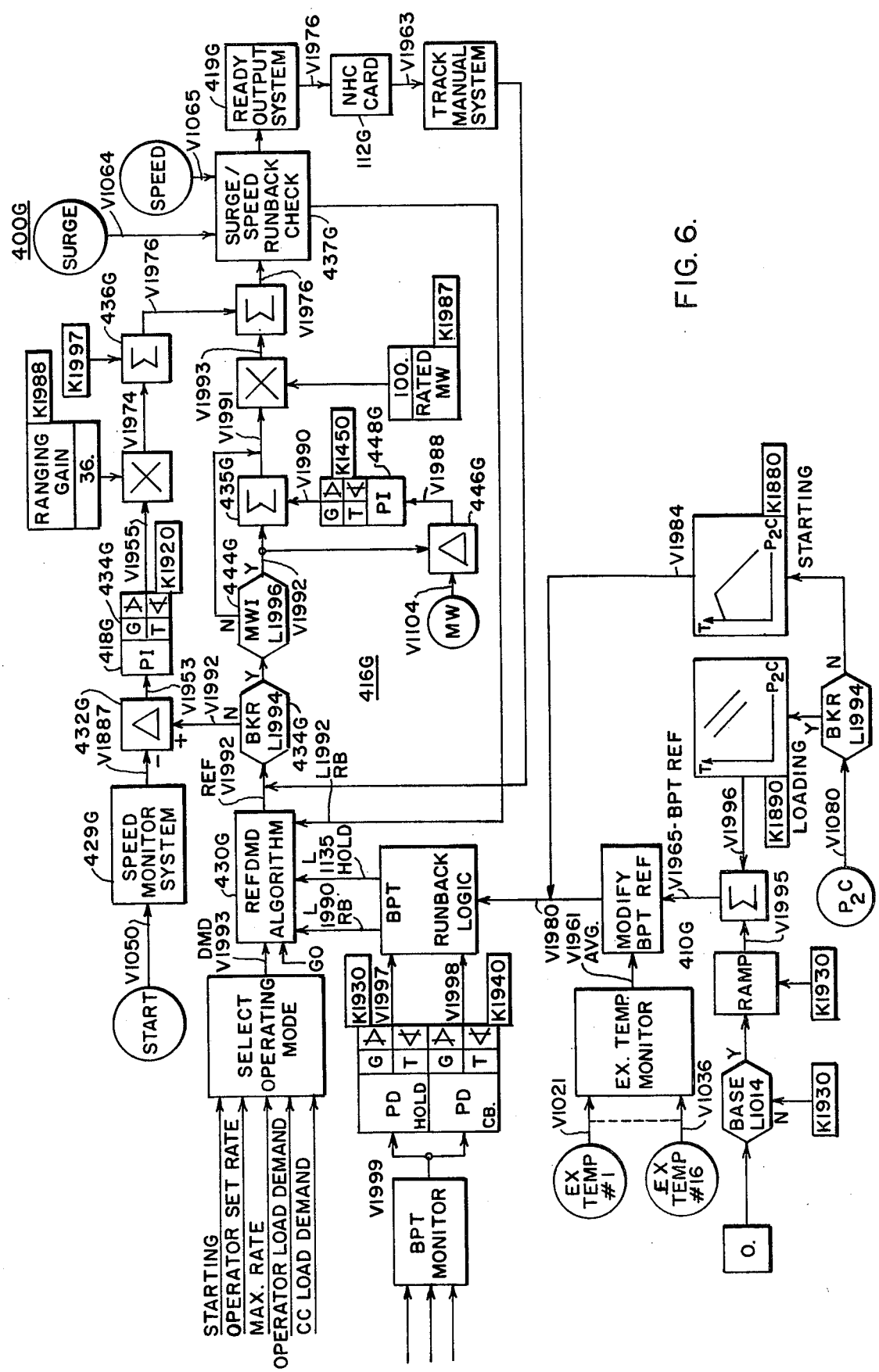
FIG. 6 shows a more detailed functional representation of various elements of the megawatt load control.

As shown more particularly in FIG. 6, the digital fuel control 416G includes the startup speed control 418G, and a reference generator 430G functions in the control system 418G in the startup mode to generate a speed reference output which increases in accordance with a stored speed startup schedule. The reference generator output is applied to a difference or error block 432G by a switching block 439G since the breaker is open during the startup mode. A speed feedback is also applied to the error block 432G by the speed monitor 425G. A proportional plug integral transfer function is applied to the output of the error block 432G by a controller block 434G and, after band limiting and range gain application, the resultant output is applied to the summer 426G. When the turbine 12 reaches the run standby state, the speed controller 418G responds to the actual speed feedback 425G and a synchronization speed setpoint generated by the reference generator 430G under the control of the operator or an external synchronizer to set the turbine fuel flow until the breaker is closed. Upon breaker closure, block 436G stores the existing ranged fuel reference from the output of the speed controller 434G for continued application to the summer block 426G during the load mode of operation.

In the load mode, the reference generator 430G functions in the megawatt load control system 400G and it generates an increasing MW reference output as a set rate to move toward an input MW load demand or setpoint. The switch block 439G applies the output of the reference generator 430G to another switch block 444G which either bypasses or inserts a load trim into the load control. If the load trim is bypassed, the forward load reference is applied directly to the summer 426G through a percent multiplier. If the load trim is selected for inclusion, a load trim is summed with the forward load reference in another block 435G and the sum is then applied to the summer 426G. In the trim control, a MW error is generated in block 446G from an MW feedback and the MW load reference and acted on by a proportional plus integral controller 448G to produce the load trim. In the summer block 426G, the load reference is added with the run standby or idle fuel reference for output from the computer 58G as a feedforward fuel reference.

Block 437G checks the external surge limit signal and the external overspeed limit signal. If either is lower than the load reference, a runback is implemented through the reference generator 430G to make the load reference equal to the actual downstream fuel reference for bumpless resumption of load control when the limit action ends.

The digital temperature limit control 410G generates either a hold output or a cutback output which is applied to the reference generator 430G to hold or cut back the megawatt load reference output from the reference generator 430G for turbine protection purposes during the load mode. In the speed control mode, similar cutback or hold action occurs. The digital temperature control is described in greater detail in another copending and coassigned patent application Ser. No. 495,725 (W.E. 45,440) entitled "A Smooth And Highly Responsive Gas Turbine Temperature Limit Control Especially Useful In Combined Cycle Electric Power Plants", and filed by J. M. Anderson, K. R. Wescott, M. M. Hobbs and R. W. Kiscaden concurrently herewith.

LOGIC AND CONTROL CHAINS AND ALGORITHMS

The following logic chains are similar for both gas turbines and are included as part of the load control system;

a. BOO3 - GT2 MIN LOAD STATUS LOGIC FIGS. 8A1, 8A2

The min load status logic responds to changes of state in the min load button logical variable L2980. When such a change occurs, usually because the operator has pushed the min load button, the trigger action of L2980 results in execution of the min load status logic, so that this control chain runs only on demand. This status logic then determines whether the min load state requested can be achieved under the existing gas turbine conditions. Should the min load state be active and the operator pushes the min load button to deactivate min load, this request is satisfied in all cases except when the turbine is being stopped in automatic control. (In this situation the min load condition is maintained until the turbine actually stops.) Should the min load state be inactive and the operator pushes the min load button to activate min load, the request may or may not be satisfied depending on existing conditions in the gas turbine control system.

The functional diagram of the min load status logic shows the interaction between the min load and the run standby buttons and their associated status logic. The min load button variable L2980 triggers the status logic, which then attempts to carry out the request. To activate min load certain permissive conditions involving manual operation of the fuel valve, coordinated control of the turbine, the state of the main generator breaker, and the temperature control mode must be satisfied. If this is the case then the min load state L2125 is achieved, the run standby button logical variabl L2981 is reset to turn off the run standby state should it have been on, and the gas turbine load demand V2993 is set to the appropriate value depending on whether the min load has been enabled or disabled and whether the turbine is set at the base or the peak limit.

b. B006 - GT2 MW/TEMP CONTROL BUMPLESS TRANSFER - FIGS. 8B1, 8B2

The MW/TEMP control bumpless transfer system responds to bids from the MW control button logic and the TEMP control button logic. When the MW control or the TEMP control buttons are pushed, the resulting software systems must enable the most recent of these buttons and disable the previous button. Thus at any time, under any circumstances, the operator may push the MW control button and be sure that he will see the proper bumpless transfer to MW control. Similarly he may push the TEMP control button and see the correct transfer.

The MW control button sets up the control computer system in such a way that, on automatic control and with the turbine generator on the line, the operator directs the MW demand with keyboard entries and with the use of the GO and HOLD buttons. The combined feedforward-feedback system then adjusts the fuel valve to produce the required generation. On manual control the computer tracking system follows the manual operation and prepares for a bumpless transfer to automatic MW control. During coordinated control the gas turbine is directed from the coordinating panel and the MW control button indicates that when the time arrives to reject from coordinated control to automatic control in such a situation the gas turbine comes back with the MW control mode operative.

The TEMP control button sets up the control computer system in such a way that, on automatic control and with the turbine generator on the line, the operator directs the MW demand to one of three targets; min load, base, or peak. In all other respects the computer takes care of the details of achieving these end points. Thus in TEMP control the keyboard and the GO and HOLD buttons cannot be used to set discrete turbine demands. On manual control the computer tracking system follows the manual operation and prepares for a bumpless transfer to automatic TEMP control. During coordinated control the gas turbine is directed from the coordination panel, and the TEMP control button cannot be selected. Rejection from coordinated to automatic control always returns in the MW control mode, from which the operator may easily go to TEMP control by pushing the TEMP control button.

The functional diagram indicates the interaction between the MW/TEMP control bumpless transfer system, the MW control button, and the TEMP control button. Both button logic systems result in a bid of the MW/TEMP control bumpless transfer, which in addition requires the proper state of permissive conditions involving the main generator breaker, manual operation, and coordinated control. Assuming that these permissives are in the proper state the MW/TEMP control bumpless transfer system positions the load demand to the correct value, depending on whether min load, base or peak is active, and sets the appropriate logical variables involving computed HOLD, GO HOLD reset, and min load to the correct state. This aligns the gas turbine computer control system to the resulting status requested by the MW and TEMP control buttons.

c. B007 - GT2 RUNBACK LOGIC, FIGS. 8C1, 8C2

The runback logic system responds to changes in state of the blade temperature (BPT) and surge/speed runback conditions in the automatic control system. The BPT logical runback variable L2990 is set when the control computer senses BPT conditions above a variable reference. The surge/speed logical runback variable L2992 is set when the computer output to the fuel valve NHC card is above the analog system surge or speed controller settings. If either of the runback states occurs on automatic control, the gas turbine fuel valve reference is runback at an appropriate rate until the condition is cleared; then the runback logical variables are reset and the control computer again begins its normal control functions.

The functional diagram indicates that the runback variables L2990 and L2992 trigger execution of the runback logic, so that this chain runs only on demand when these variables change state. The diagram also shows that the main generator breaker acts as a permissive to the runback logic; in addition, bids are placed for the flame logic BOOC and the auto sync logic BOOA by the runback logic software. These latter bids are required to enable or disable certain operating modes in the existence of a runback condition, and to recover properly after the runback ceases.

d. BOOB - GT2 MW IN/OUT LOGIC - FIGS. 8D1, 8D2

The MW in/out logic responds to bids from other control system chains which detect conditions that affect the status of the MW feedback loop being in or out of service. Under normal conditions with the turbine generator on the line, the MW feedback loop is always in service. Thus with this feedback trim signal, the fuel valve can be adjusted to produce generated MW which are always essentially equal to reference MW. The MW feedback is in serivce in all automatic and coordinated modes of operation, including both MW control and temperature control.

There are only two conditions in which the MW feedback loop is out of service; one of these is the case when the main generator breaker is open and the turbine is in the speed control mode. The other is when the MW transducer fails such that the analog input representing the generated MW is unreliable. In this case the MW feedback loop is taken out of service with a bumpless transfer scheme which maintains the fuel valve position constant throughout the transfer. During the time when the MW transducer is failed, the gas turbine load control system operates with feedforward, or open loop, control only. As soon as the transducer problem is repaired and the MW signal becomes reliable again, the computer places the MW feedback loop back in service automatically and bumplessly. Then the gas turbine load control system operates in its normal configuration of combined feedforward and feedback.

The functional diagram indicates the interaction between the MW in/out logic, the MW bumpless transfer system, and related additional control chains. It is seen from the functional diagram that the MW in/out logic is bid by the bumpless transfer system, the main generator breaker logic BOOE, and the fuel valve auto/manual logic BOOO. The primary outputs of the MW in/out logic are a logical variable which indicates the state of the MW in/out loop L2996 and a contact output L2259 which lights a monitor lamp on the vertical portion of the gas turbine BTG board to indicate visually the status of the MW feedback loop.

e. BOOD - GT2 GO HOLD LOGIC - FIGS. 8E1, 8E2

The GO HOLD logic system responds to a number of conditions to the control computer system which require evaluation of the GO and/or the HOLD states. Primary among these are bids for execution of this GO HOLD logic issued by the GO button and the HOLD button logic systems. These bids are made when the operator pushes the GO or the HOLD button and certain preliminary criteria for validity of these buttons are satisfied. Then the GO HOLD logic examines the detailed situation with respect to GO and HOLD.

Bids for evaluation of the GO HOLD logic are also made from the fuel valve auto/manual logic system, from the main generator breaker logic system, and from the coordinated control system. These bids are placed mainly to turn off both GO and HOLD when the turbine rejects to manual control, when the main generator breaker opens, and when the gas turbine is placed in coordinated control. During each of these modes of operation, the GO HOLD logic system is not in service.

The GO HOLD logic is also triggered by computed logical variables internally within the control system. These variables consist of a computer HOLD, in which case the control system has concluded that conditions in the turbine require a hold on the fuel reference; and a computed reset of both GO and HOLD, in which case the control system has moved the turbine reference to the demand and therefore has accomplished the objectives of the GO HOLD system.

The functional diagram indicates the interrelationship between the GO HOLD logic system, the GO button, the HOLD button, and the various control system chains which bid the GO HOLD logic. Also shown is the permissive condition involving the temperature control mode, during which the GO and HOLD buttons are not operative. It is only during the MW control mode, when the operator directs the turbine from the keyboard on automatic load control, that GO and HOLD are validly used.

Finally, the GO HOLD logic system executes only on demand when its trigger variables change state, when the GO or HOLD buttons are pushed, or when turbine operating conditions are such as to require bids of the GO HOLD logic to reject both GO and HOLD due to manual, coordinated, or speed control.

f. B026 - GT2 MW IN/OUT BUMPLESS TRANSFER - FIGS. 8D1, 8D2

Functional Description

The MW in/out bumpless transfer system responds to change in state of the MW unreliable logical variable L2995. This control chain performs the calculations necessary to guarantee a bumpless transfer from a reliable to an unreliable signal, or from unreliable to reliable. This transfer maintains the fuel valve position constant while the MW signal goes through these transitions.

Under normal operating conditions with the turbine generator on the line, a MW feedback loop is always in service. Thus with the MW feedback trim signal, the fuel valve can be adjusted to produce generated MW which always are essentially equal to the reference MW. The MW feedback system is in all automatic and coordinated control modes of operation, including both MW control and temperature control. However, when the MW analog input is determined to be unreliable by other computer system chains, it becomes necessary to disable, or take out of service, the MW feedback loop in a bumpless transfer scheme so that the fuel valve does not move during the transition interval. During this time when the MW transducer is failed the gas turbine load control system operates with feedforward, or open loop, control only. As soon as the transducer problem is repaired and the MW signal becomes reliable again, the computer places the MW feedback loop back in service in a bumpless transfer scheme so that the fuel valve does not move during the transition interval. Then the gas turbine load control system operates in its normal configuration of combined feedforward and feedback.

The functional diagram indicates the interaction between the MW in/out bumpless transfer system, the MW in/out logic, and related additional control chains and permissive conditions. The diagram shows the change of state of the MW unreliable logical variable L2995 triggers execution of this MW in/out bumpless transfer chain, so that the software runs only on demand. The state of the main generator breaker L2994 acts as a permissive to this bumpless transfer computation. If the breaker is open and the turbine is on speed control, the MW feedback loop is not operative and the unreliable signal is simply ignored. But if the main breaker is closed and the unit is on the line, the bumpless transfer computations are carried out and the MW in/-out logic is bid so that it may execute and align additional logical states.

Theoretical Derivations

The prime purpose of the MW in/out bumpless transfer is to maintain the fuel valve at a fixed position during the transition from the MW feedback loop in service to out of service, or from the MW loop out of service to in serivce. The general technique involved is to write analytical equations for the control computer signal which goes to the fuel valve NHC card for the case of the loop in service and then out of service. These expressions may then be equated and solved for the condition required to maintain a bumpless transfer.

Figure 9A:
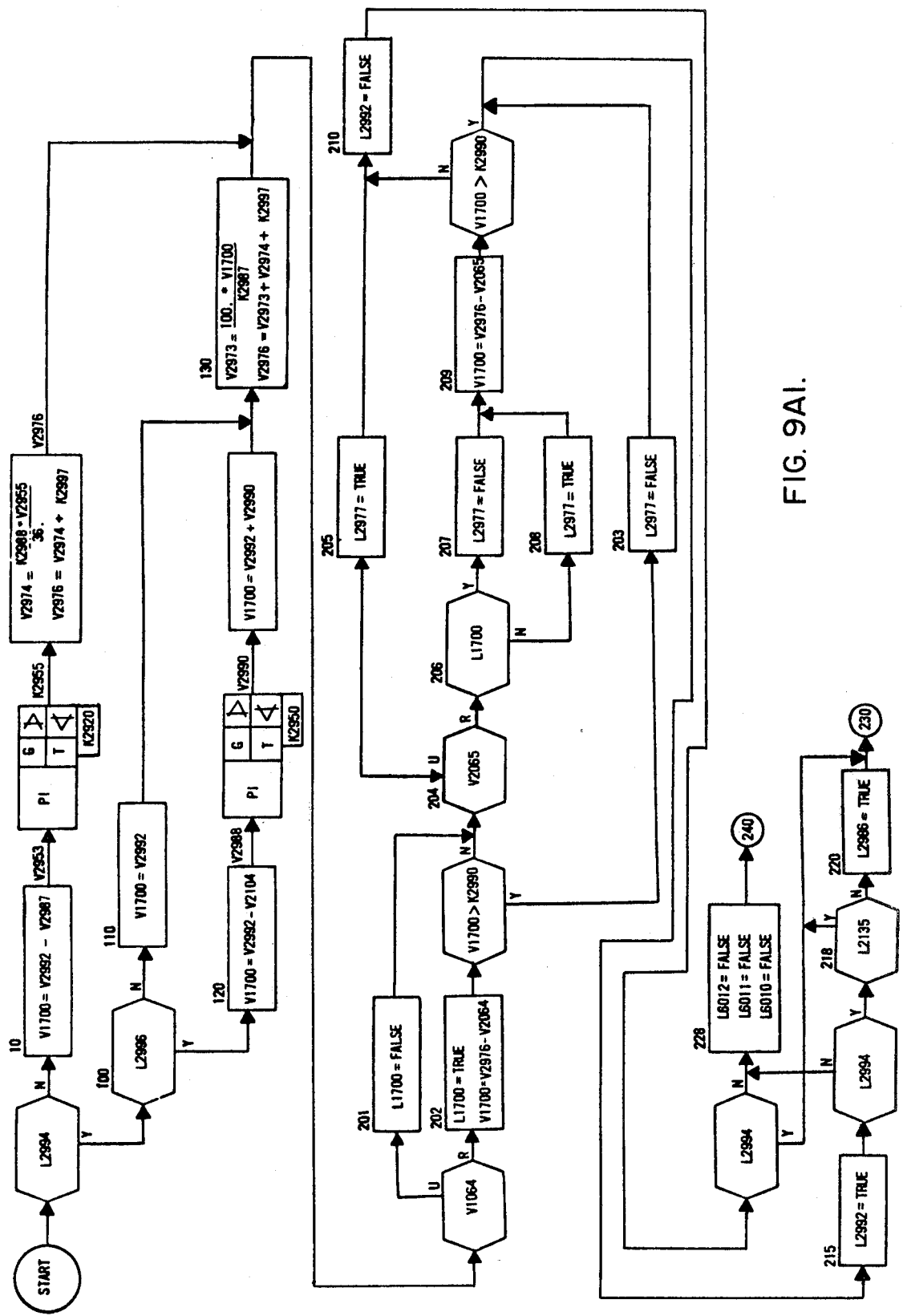

A diagram of the MW control loop is shown in FIGS. 9A1, 9A2 to illustrate the quantities involved. The MW contribution to the NHC card output is V2973, and is summed with the speed contribution V2974 to form the total NHC card output V2976. On load control, the speed portion V2974 is fixed at whatever it took to synchronize the turbine generator. Thus we need only concern ourselves with the load contribution V2973 which involves the MW feedback loop. When the loop is in service L2996 is true and the lower path is taken to compute the MW controller contribution. On the other hand, when the loop is out of service the upper path is taken to bypass the feedback contribution.

During a MW in/out bumpless transfer, the control computer must switch from one of these paths to the other and maintain the fuel valve constant. On examining the diagram in FIGS. 9A1, 9A2 closely we may conclude that this means the computed value of the temporary variable V1700 must not change. If this can be accomplished V2973 will not change since it is related to V1700 only by constants. Therefore the aim of these derivations will be to determine the conditions required to hold V1700 constant. We will consider two cases, one in which the loop goes from out of service to in service and the other for which the loop returns to service.

Case 1 - MW Loop Returning To Service

Here, write the equations for V1700 in FIGS. 9A1, 9A2 just before the loop returns and just after it has returned. The first equation is subscripted "OUT", since MW feedback is out of service, while the second set of equations is subscripted "IN", since the feedback loop is in service.

OUT $$V1700_{OUT} = V2992_{OUT} \quad (1)$$

IN $$V1701 = V2992_{IN} - V2104 = V2988 \quad (2)$$

$$V2990 = K2950 \times V1701 + (1/T)S\ V1701\ DT \quad (3)$$

$$V1700_{IN} = V2992_{OUT} + V2990 \quad (4)$$

Just before the loop returns to service we know the value of $V2992_{OUT}$ and therefore $V1700_{OUT}$. In addition, just after the loop returns we know the value of the MW analog input V2104. Suppose then that we used a technique which forced the MW controller error signal V1701 = V2988 to be 0; this would then eliminate the proportional part of the controller output, since the proportional gain multiplied by a 0 error signal yields 0 output. This 0 error can easily be accomplished by making the MW reference $V2992_{IN}$ equal to the existing MW when the loop returns to service. This may be written as follows:

SET $$V2992_{IN} = V2104 \quad (5)$$

THEN:

$$V1701 = 0 \quad (6)$$

$$V2990 - (1/T)S\ 0\ DT = V2989 \quad (7)$$

$$V1700_{IN} = V2104 + V2990 \quad (8)$$

Eliminate and simplify Equation (8);

$$V1700_{IN} = V2104 + V2989 \quad (9)$$

Now set Equation (9), the value of V1700 the instant after the loop returns to service, equal to Equation (1), the value of V1700 the instant before the loop returns to service;

$$V2104 + V2989 = V2992_{OUT} \quad (10)$$

Now in Equation (10) we know the MW value V1104 and we have available in computer memory the value V2992. Therefore we can compute the required value of the MW integrator V2989 to make the MW loop return to service bumplessly:

$$V2989 = V2992_{OUT} - V2104 \quad (11)$$

To review the steps to guarantee the bumpless transfer in returning the MW loop to service, it is necessary only to do the following:

1. Set MW controller last input V2988 = 0
2. Set MW integrator $V2989 = V2992_{OUT} - V2104$
3. Set MW reference $V2992_{IN} = V2104$
4. Set MW demand V2993 = V2992

Case 2 - MW Loop Going Out Of Service

The technique here is similar to that above. Now we evaluate V1700 for the instant just before the loop goes out of service and subscript this "IN"; next evaluate V1700 just after the loop goes out of service and call this "OUT":

IN $$V1700_{IN} = V2992_{IN} + V2990_{IN} \quad (12)$$

OUT $$V1700_{OUT} = V2992_{OUT} \quad (13)$$

Now simply equate these two expressions to maintain the bumpless transfer:

$$V1700_{OUT} = V1700_{IN} \quad (14)$$

Substitute (12) and (13) into (14):

$$V2992_{OUT} = V2992_{IN} + V2990_{IN} \quad (15)$$

Now since the value of the MW reference $V2992_{IN}$ and the MW controller $V2990_{IN}$ are available in computer memory for the instant just prior to the loop failing, then Equation (15) can be solved for the necessary value which the MW reference $V2992_{OUT}$ must have to take the loop out of service bumplessly.

To review the steps to guarantee this bumpless transfer in taking the MW feedback loop out of service, it is necessary only to do the following:
1. Set MW reference $V2992_{OUT} = V2992_{IN} + V2990$
2. Set MW demand $V2993_{OUT} = V2992_{OUT}$ g. D014 - GT2 TEMP CONTROL BUTTON LOGIC - FIGS. 8G1, 8G2

The TEMP control button logic responds to the operator pushing the TEMP control button on the gas turbine BTG board. Normally, this button functions on automatic load control, when the main generator breaker is closed. It allows the operator to select either min load, base, or peak as the turbine MW demand. The computer control system then immediately beings to adjust the turbine reference to meet the demand at the rate selected by the operator. There is no requirement for keyboard entries or use of the GO and HOLD buttons; in fact, these are invalid during the temperature control mode, with the computer ignoring GO and HOLD and flashing the cancel lamp if the keyboard is used to attempt a load demand entry. The combined feedforward-feedback computer control system adjusts the fuel valve and the inlet guide vane to yield generated MW's equal to reference MW's as reference moves toward min load, base, or peak.

The functional diagram indicates the interaction between the TEMP control button, the MW control button, and various permissive conditions required for each. When the TEMP control button is pushed the BTG board hardware circuitry generates an interrupt, which is received and decoded by the control computer. The software operating system identifies the interrupt and bids this TEMP control button logic, which in turn performs the proper logical manipulations to enable TEMP control, disable MW control, and bid the MW/TEMP control bumpless transfer chain.

The functional diagram indicates the cross-coupling effect of the TEMP control and the MW control buttons. Pushing one of these enables itself and disables the other. This can be done at any time, under any operating circumstances, with the MW/TEMP control bumpless transfer system taking care of the various situations depending on existing turbine and BTG board conditions.

h. D015 - GT2 MW CONTROL BUTTON LOGIC - FIGS. 8H1, 8H2

The MW control button logic responds to the operator pushing the MW control button on the gas turbine BTG board. Normally, this button functions only on automatic load control, when the main generator breaker is closed; it allows the operator to enter the turbine MW demand from the keyboard. The control computer system then adjusts the turbine reference to meet the demand at the rate selected by the operator, with the GO and HOLD buttons functioning to allow the operator to jog or maneuver the reference, depending on operating conditions. The combined feedfoward-feedback computer control system then adjusts the fuel valve and the inlet guide vane to yield generated MW equal to the reference MW, while maintaining the turbine metal temperatures within design limits.

The functional diagram indicates the interaction between the MW control button, the temperature control button, and various permissive conditions required for each. When the MW button is pushed the BTG board hardware circuitry generates an interrupt, which is received and decoded by the control computer. The software operating system identifies the interrupt and bids the MW control button logic which, in turn, performs the proper logical operations to enable MW control, disable temperature control, and bid the MW/TEMP control bumpless transfer chain.

The functional diagram indicates the cross-coupling effect of the MW control and the TEMP control buttons. Pushing one of these enables itself and disables the other. This can be done at any time, under any operating conditions, with the MW/TEMP control bumpless transfer system taking care of the various situations depending on existing turbine and BTG board circumstances.

i. D016-GT2 MIN LOAD BUTTON LOGIC-FIGS. 8I1, 8I2

The min load button logic responds to the operator pushing the min load button on the gas turbine BTG board. Normally, this button functions primarily in the temperature control mode on automatic control, and it serves as a target or end point to which the gas turbine generator moves. If the turbine is accelerating automatically, the min load button indicates that the computer control system will roll the unit to synchronous speed, allow closing of the main generator breaker either manually or automatically, and then hold the turbine generator at the minimum load level (usually about 4 MW). If the turbine is on the line in the temperature control mode, the min load button indicates that the computer control system reduces load from the current level to the minimum load level, at a rate which the operator sets from the keyboard, and then maintains this min load condition.

The functional diagram shows the interrelationship between the min load button and other portions of the computer control system. When the button is pushed the BTG board hardware circuitry generates an interrupt, which is received and decoded by the computer. The software operating system identifies the interrupt and bids the min load button logic, which then checks validity conditions for proper use of the min load button. If conditions are correct, this chain logically inverts the min load button variable L2980; the resulting change of state triggers the min load status logic system to perform the internal computer switching required to process the min load state.

The functional diagram indicates a cross-coupling action between the min load button and the run standby button. The run standby state maintains the gas turbine at synchronous speed, but inhibits automatic synchronization. Thus run standby and min load are closely related, and are separated only by the main generator breaker. Run standby maintains synchronous speed prior to going on the line, while min load maintains minimum load after going on the line.

j. D046-GT2 HOLD BUTTON LOGIC-FIGS. 8J1, 8J2

The HOLD button logic responds to the operator pushing the HOLD button on the gas turbine BTG board. This button is operational only during load control (the main generator breaker closed) with the gas turbine on automatic control in the MW control mode. The HOLD button holds (suspends temporarily) the turbine MW reference from moving toward the MW demand, which has been previously entered by the operator from the keyboard. In conjunction with the HOLD button the GO button allows the operator to restart the MW reference moving to demand during automatic control in the MW control mode. The rate in MW/MIN at which the reference ramps to demand is set by the operator through use of the load rate button and the keyboard. Thus with this HOLD and GO ability the operator may move the turbine generator output automatically in a jogging pattern, in a continuous raise or lower pattern, or in various combinations to suit existing circumstances. On automatic control, the computer system always adjusts the fuel valve and the inlet guide vane to produce the MW required by the reference and to keep the turbine temperatures within design limits.

The functional diagram indicates the interrelationship between the HOLD button, the GO button, and the GO HOLD logic system. When the HOLD button is pushed the BTG board hardware circuitry generates an interrupt which is received and decoded by the control computer. The software operating system identifies the interrupt and bids the HOLD button logic. Thus, this chain executes only on demand when the HOLD button is pushed. The HOLD logic then examines turbine operating conditions to determine if the HOLD button is operational. If so, appropriate additional control chains are activated to continue the processing of the HOLD button. If the turbine conditions imply that HOLD is not operational, the chain simply exits.

k. D047-GT2 GO BUTTON-FIGS. 8K1, 8K2

The GO button logic responds to the operator pushing the GO button on the gas turbine BTG board. This button is operational only during load control (the main generator breaker closed) with the gas turbine on automatic control in the MW control mode. The GO button starts the turbine MW reference moving toward MW demand, which has previously been entered by the operator from the keyboard. The rate in MW/MIN at which reference ramps to demand is set by the operator through use of the load rate button and the numerical keyboard. In conjunction with the GO button, the HOLD button allows the operator to hold (suspend temporarily) the MW reference during automatic operation in the MW control mode. Thus with this GO and HOLD ability, the operator may move the turbine generator output automatically in a jogging pattern, in a continuous raise or lower pattern, or in various combinations to suit existing circumstances. On automatic control the computer system always adjusts the fuel valve and the inlet guide vane to produce the MW required by the reference and to keep turbine temperatures within design limits.

The functional diagram indicates the interrelationship between the GO button, the HOLD button, and the GO HOLD logic systems. When the GO button is pushed the BTG board hardware circuitry generates an interrupt, which is received and decoded by the control computer. The software operating system identifies the interrupt and bids the GO button logic, so that this chain executes only on demand. The GO logic examines turbine operating conditions to determine if the GO button is operational. If so, appropriate additional control chains are activated to continue the processing of the GO button. If the turbine conditions imply that GO is not operational the chain simply exits.

l. D05E-GT2 BASE/PEAK BUTTON LOGIC-FIGS. 8L1, 8L2

The BASE/PEAK button logic responds to changes in state of contact inputs which correspond to the BASE and the PEAK buttons on the gas turbine BTG board. These buttons set upper blade path temperature (BPT) limits to which both the analog and the digital control systems respond. In base operation the limit is computed from a curve relating blade path temperature to combustor shell pressure (P2C), while in peak operation a higher limit, usually about 50° F., is computed and used in the analog and the digital control systems.

The BASE and PEAK buttons are each wired directly to the analog control center, which then retransmits these logical states to the control computer as contact inputs. Change of state in these contacts then trigger execution of this BASE/PEAK button logic; thus this control chain runs only on demand when the BASE or PEAK buttons are pushed.

The functional diagram indicates that a number of permissive conditions must be satisfied before the control computer takes action as a result of the BASE and PEAK buttons. Thus the turbine must be on automatic control with the main generator breaker closed in order to allow the digital control system to react to these buttons. In addition, if the gas turbine is in the temperature control mode, then the turbine MW demand will immediately be raised to the base or peak level, and the automatic control system will begin to adjust the reference to this new value.

The following control chains are also alike for both gas turbines and are included as a part of the load control system:

A. GT2-SELECT OPERATING MODE-8005-FIGS. 9A1, 9A2

In the operating mode selection chain, the speed and load references are generated according to the mode of plant or turbine operation. If the gas turbine is on manual fuel valve operation as indicated by the logical variable L2976, the track manual chain 8003 is bid and the select mode chain 8005 is ended. If automatic digital fuel control is operative, the flow chart path depends on whether the turbine is in wide range speed control, the synchronization process, or load control.

If the breaker is open as indicated by the variable V2994, the turbine is in wide range speed control. In turn, the variable L2967 indicates whether the turbine is under automatic startup speed control and if it is, the time V2952, which starts at the time point of flame on, is advanced by one second and the speed reference V2992 is determined from the stored speed-time curve K2850. If synchronous speed has not yet been reached, the speed/load chain 8004 is then bid to put the new speed reference in the integrator speed control loop and lift the turbine fuel flow to produce an actual turbine speed equal to the speed reference. When the turbine reaches synchronous speed, i.e. when the speed curve time has expired at 720 seconds, auto start L2967 is set false and the reference V2992 is set equal to 3600 rpm for manual or automatic synchronization.

On automatic synchronization, the variable L2971 is true and reference V2992 is set equal to its last value plus or minus 1 rpm according to whether a raise pulse or a lower pulse has been received from the external automatic synchronizer. Further, the demand V2993 is set equal to the new reference and the speed/load chain 8004 is bid to boost or lower the turbine speed by 1 rpm.

If the turbine is on manual synchronization, the auto start variable L2967 is false and the reference change rate V2982 is set equal to a stored manual sync acceleration rate V2982 which can be 1 rpm per second. In manual synchronization, the operator cannot override the reference change rate. The GO and ATS variables L1700 and L1703 are set true, the algorithm REFDMD outputs a changing reference V2992 according to the manual sync rate on and the speed/load chain 8004 is bid. As turbine speed changes and a line match occurs, the operator closes the breaker. If the turbine speed crosses the line speed without breaker closure, the operator puts in a new speed reference which will cause a recrossing of the turbine and line speeds or frequencies.

If a blade path temperature, surge or speed runback exists as indicated by L2992 or L2990, the reference change rate V2982 is made equal to the surge/speed runback rate K2973 or the BPT runback rate K2972, automatic start is bypassed, and the REFDMD algorithm generates the speed reference in accordance with the runback rate. Next, the speed/load chain 8004 is bid to change the turbine speed in accordance with the speed reference runback.

In load control, a runback similarly causes the load reference change rate to be set equal to the surge/speed load runback rate K2995 or the BPT load runback rate K2975. The REFDMD algorithm then implements the load reference runback.

In normal load operation without plant coordination, the load change rate V2982 is set equal to the operator selected load rate V2994 and a check is made to make sure the operator load demand is at least equal to minimum load. If temperature control L2130 is not selected, the algorithm REFDMD generates a load reference V2992 in accordance with the operator load demand V2993 at the operator load rate V1974. The speed/load chain 8004 is bid to operate to change the turbine fuel flow in accordance with the new load demand.

In coordinated control, the load demand and rate are made equal to V2979 and V2978 which are generated at the coordinated control level. If the temp change rate L5056 is excessive, the rate V2982 is made zero. The rate is also made zero in noncoordinated control, i.e. operator automatic control, if the digital temp control becomes limiting in load control as indicated by the variable L2130. As in other cases, the algorithm REFDMD generates the reference in accordance with the coordinated load demand and the coordinated rate or the temperature limiting rate.

In cases where it is desired to provide fixed time startup even though a hold or runback occurs, the select operating mode flow chart is modified as preferably indicated in the flow chart for chain 8005-A. Generally, this flow chart only shows the additional functions needed to provide time makeup. Thus, on a hold or runback, the acceleration timer continues to count, and on release of the hold or runback, a new rate schedule, i.e. a higher speed curve slope is executed until the time is made up or until 3400 rpm at which time the normal speed curve slope applicable at that value is employed to enable stable transition through bleed valve closing and synchronization. In this embodiment, the hold or runback time is only partly made up if it is not made up by the time the turbine reaches 3400 rpm.

B. GT2-SPEED/LOAD CONTROL-8004-FIG. 9B

Chain 8004 contains controllers to adjust the gas turbine fuel to attain a desired speed or load setpoint. In order to determine whether speed or load control is selected, the chain first checks the breaker logical variable L2994. If the breaker is open, a speed control path is taken where a speed error is formed by subtracting the actual speed from the speed reference. This error is then fed into a proportional plus integral controller with limits, the output of which is ranged to the proper magnitude for output later to the throttle valve. When the breaker closes the last value of this throttle valve output, i.e. the idle fuel reference, is stored for later addition to the load fuel reference value.

If the breaker is found to be closed it means that the gas turbine is on line generating power and therefore in a loading mode. A check is then made to see if megawatt control has been selected and, if not, the reference from the reference demand REFDMD block is fed forward for summation with the last speed controller output after proper ranging for the throttle valve. This reference is under the control of other chains such as the blade path exhaust temperature control chain 8001 when megawatt control is not active.

If megawatt control is active, a path is taken through the feedforward plus trim megawatt control calculations. In this path the error between the megawatt reference and the actual generated megawatts is calculated and fed to a proportional plus integral control block with limits and its output is then summed with the original reference and ranged for the throttle valve. The resulting ranged signal is then summed with the idle fuel reference before being stored for later output.

At label 200 the speed and load control paths rejoin and the calculated throttle valve signal is checked against the external hardware surge and speed controller outputs providing that the readings of these signals have been found reliable. If the throttle valve signal as calculated by the speed or load controller exceeds either of the two limits, hold or runback logical flags are set provided the proper conditions exist.

Beginning at label 230 the chain checks actual generated megawatts against various load megawatt levels to determine if the gas turbine is at minimum, base or peak load. The appropriate logical variables are then set true for output as status lights on the operator control panel and for use by other chains. Chain 8004 exits after bidding for the Ready/Output chain 8002.

C. REFDMD-REFERENCE/DEMAND CONTROL-FIGS. 9C, 9D1, 9D2

The REFDMD algorithm provides the PACE control computer system with a controller which moves a turbine or plant reference toward a targeted demand. The algorithm includes additional features to handle runback situations and to manipulate logical variables which, in turn, operate boiler-turbine-generator (BTG) board lamps. REFDMD is normally executed periodically, once a second, by various control system chains.

The operating philosophy of the entire PACE computer control system is based on a reference-demand concept. The demand variable represents a target to which any turbine or the entire plant is set. This may be a speed demand in rpm during wide-range speed control, or it may be a load demand in megawatts during load control. The mechanism for setting the target demand varies with the operating mode of the turbine or plant. During automatic control, for example, the demand may be entered from a keyboard by the operator, or it may be internally computed by control system software. During coordinated control the plant demand is set by the operator from a keyboard, but the various turbine demands are computed by the coordination system. During manual control, the demand is internally computed by software which is continually tracking the manual operation in preparation for bumpless transfer to automatic control.

The reference variable represents the actual turbine or plant condition on a second-by-second basis. The reference is always moving toward the demand at a rate which depends on the operating mode of the turbine or plant. During automatic control the rate, in rpm per minute or MW per minute, may be entered by the operator from a keyboard, or it may be computed by internal software. During coordinated control the operator sets the plant load rate, but the coordination system computes the individual turbine rates. During manual control the rate is internally set by software which tracks continuously the manual operation in preparation for bumpless transfer to automatic control.

The REFDMD algorithm provides the control computer with the ability to accomplish this reference-demand philosophy. It maneuvers reference at the appropriate rate, responds to runback situations, does the bookkeeping to properly terminate software when reference equals demand, and generates logical signals to place GO and HOLD lamps in appropriate states.

A program using the REFDMD algorithm requires identification of eleven arguments, as follows:

| | |
|---|---|
| REFDMD | |
| | DEMAND = VXXXX |
| | REF = VXXXX |
| | RATE = KXXXX |
| | GO = LXXXX |
| | HOLD = LXXXX |
| | OFF = LXXXX |
| | ATS = LXXXX |
| | LIMIT = LXXXX |
| | RUNBACK = LXXXX |
| | BREAKER = LXXXX |
| | MINLOAD = KXXXX |
| DEMAND | - A V Number containing the target demand to be achieved by the REFDMD algorithm. |
| REF | - A V number containing the reference which is to be maneuvered by REFDMD to reach demand. |
| RATE | - A V number containing the rate at which REFDMD is to move REF toward demand. |
| GO | - AN L number indicating the status of the GO button and lamp. When GO is set true, REFDMD moves REF toward demand, when GO is reset false REFDMD does not move REF. |
| HOLD | - An L number indicating the status of the HOLD button and lamp. When HOLD is set true, REFDMD will not move REF, and will turn off HOLD if REF and demand are equal. When HOLD is reset false, REFDMD takes no action as far as HOLD is concerned. |
| OFF | - An L number indicating the status to be used in turning off GO and HOLD. When REFDMD finds REF and demand equal, it sets off true; this triggers a control system chain which turns off both the GO and HOLD lamps. |
| ATS | - An L number indicating the status of the automatic turbine startup (ATS) software, which provides supervision of the steam turbine portion of the PACE plant. When ATS is set true, the REFDMD algorithm does not turn off the GO and HOLD lamps, since these are not operable in the ATS mode. When ATS is reset false, REFDMD takes no action as far as ATS is concerned. |
| LIMIT | - An L number which indicates the status of the valve position limit of the steam turbine computer control system. This is a special logical system which does not allow the steam turbine control valves to be raised above an adjustable setpoint. When REFDMD finds limit set true and REF is attempting to move up towards demand, REFDMD does not raise REF until the limit condition is reset. When limit is set true and REF is attempting to move down toward demand, REFDMD allows REF to decrease. When limit is reset false, REFDMD takes no action as far as limit is concerned. |
| RUNBACK | -An L number which indicates a contingency status. If runback is set true, REFDMD lowers REF at the rate value; should the breaker on the unit be closed the runback stops at minimum load, while the runback continues to zero if the breaker is open. |
| BREAKER | - An L number indicating the breaker state. This |

| | |
|---|---|
| | argument is used only when the runback state is set; then for a closed breaker status, the runback proceeds only to minimum load. |
| MINLOAD | - A K number indicating the minimum load which can be requested on the turbine. REFDMD uses this argument only if a runback occurs and the main generator breaker is closed. |

The REFDMD algorithm first checks the runback; argument; if it is true, the reference is decreased by the amount of rate (divided by 60 to convert units per minute to units per second). If the breaker is closed, the new value of REF is compared with minload. Should REF be smaller than minload, REF is then set equal to minload; if REF is greater than or equal to minload, the algorithm exits.

Should runback be false, REFDMD checks the state of the GO argument. If GO is false, another check is made on the equality of REF and demand. Should these be equal and the HOLD lamp be on, the off argument is set true. This triggers another control system chain which turns off both the HOLD and GO lamps. If REF and demand are not equal when go is false, REFDMD simply exits.

If GO is true, then the difference between demand and REF is computed and placed in temperature, and rate is divided by 60 to convert it to units per second, and is placed in both TEMP1 and TEMP2. The value of temperature is then checked against zero; if temperature is greater than zero, demand is greater than REF and the reference must be increased. Therefore an internal logical variable up is set true. If temperature is less than zero, demand is less than REF and the reference must be decreased. Therefore the internal logical variable up is made false and the algebraic sign of temperature and TEMP2 reversed.

Temperature has a positive sign as a result of the above tests, so that it represents the magnitude of the difference between demand and REF. The magnitude in temperature is compared against TEMP1, which contains the size of the step change to be made in REF this second. (This is the result of dividing rate which is in units per minute by 60 to yield units per second, the step change each second.) If temperature is greater than TEMP1, REF is greater than one step from demand; in this case, the VPLIM argument is checked to see if it is true while REF is going up. If so, the reference is at such a level as to cause a valve position limit situation; therefore, REF may not be increased and REFDMD exits at this point.

If there is no valve position limit, the increment in TEMP2 (which now has proper polarity to raise or lower REF as described in the above paragraphs) is algebraically added to the current value of REF. A test is made to determine if this addition has made REF less than 0. If so, REF is set to zero; otherwise REFDMD exits.

If the magnitude test on temperature versus TEMP1 shows that temperature is equal to or less than TEMP1, the value of reference is within one step size of demand. REF is made exactly equal to demand, and a test made on the state of the ATS argument. If it is false, off is set true; this then triggers a special control system chain which turns off both GO and HOLD lamps, after which REFDMD exits, if the ATS argument is true, REFDMD exits immediately since GO and HOLD lamps are not functional in the ATS control mode.

D. RAMP—RAMP CONTROLLER FIGS. 9E1, 9E2, 9E3

The ramp algorithm provides the PACE control computer system with a controller which ramps an output variable at a linear rate toward an input variable. A sketch of a typical ramp waveshape is shown on the flow chart. The ramp algorithm is normally executed periodically, once a second, by various control system chains. Its most common use is in tracking schemes, where the ramp function contains the mismatch between a manual system and the automatic system. When control is switched to automatic, a bumpless transfer takes place and the mismatch is slowly removed at a controlled rate by the ramp controller. The ramp algorithm is also used in situations where switching occurs under normal operating conditions; an example is the change from base to peak operation of the gas turbines, during which a higher operating temperature bias is gradually entered into the control system through the ramp algorithm.

A program using the ramp algorithm requires identification of three arguments, as follows:

| | |
|---|---|
| RAMP | DEMAND = VXXXX<br>REF = VXXXX<br>RATE = KXXXX |
| DEMAND | - A V number containing the input to the ramp algorithm; demand represents the ultimate output or target of the ramp controller. |
| REF | - A V number containing the output of the ramp algorithm, REF will approach demand at a linear rate. |
| RATE | - A K number containing the linear rate at which REF is to approach demand. Rate normally has dimensions of units per minute, such as degrees per minute or percent per minute. The algorithm internally converts these to units per second, since the control system normally executes once per second. |

The ramp algorithm first computes the difference between the input demand and the output REF and checks whether this is zero; if so the algorithm exits. If not, the rate is divided by 60 to compute the incremental change to be made in REF on a per-second basis, and then this is saved in temporary locations. The non-zero difference between demand and REF is next examined for algebraic sign to determine whether REF has to be raised or lowered in its linear approach to demand. If the difference is negative, the polarities of the temporary locations are reversed, since this indicates REF must decrease to reach demand.

Next the difference between demand and REF, which by now has been converted to a magnitude by the sign operations described above, is compared with the incremental step change computed from rate. If the difference is greater than the increment, the increment is algebraically added to REF and the algorithm exits. If the difference is less than the increment, this means that REF is within one increment of demand; therefore, the ramp algorithm sets REF exactly equal to demand and then exits.

E. GT2 - SPEED MONITOR - 8006

The first major section in chain 8006 is a check to see if the auto start or the start logical variables should be set true. These two logicals are set true provided that the following conditions are met: the breaker is open, the unit is in coordinated control, the start relay, 4X, represented as logical variable L2082 is not true and the unit has reached hot standby status. If all these conditions are met the variables L2265, auto start, L2966, L1966, start, are set true.

The chain then proceeds to a section where speed, V2050, is checked for reliability and logical variable L2993, speed unreliable, is set true or false accordingly. The selected speed V2987 is then set equal to speed V2050.

A check is now made on breaker status and if the breaker is found to be closed the chain proceeds to label 220, otherwise a further speed check is performed to determine whether the unit has reached synchronous speed. Logical variables for various panel indicators such as the sync speed lamp and for interface contacts with the synchronizer are set true or false as a result of this check. After the synchronous speed check comes a section of the chain which examines the auto stop, L2968 and normal stop, L6093, logical variables. If either has been set for some number of passes through the chain a stop logical variable L2260 is set true. The program now goes to label 220 where it bids for the temperature control chain 8001 and checks the megawatt reading for reliability before exiting.

Figure 8E:
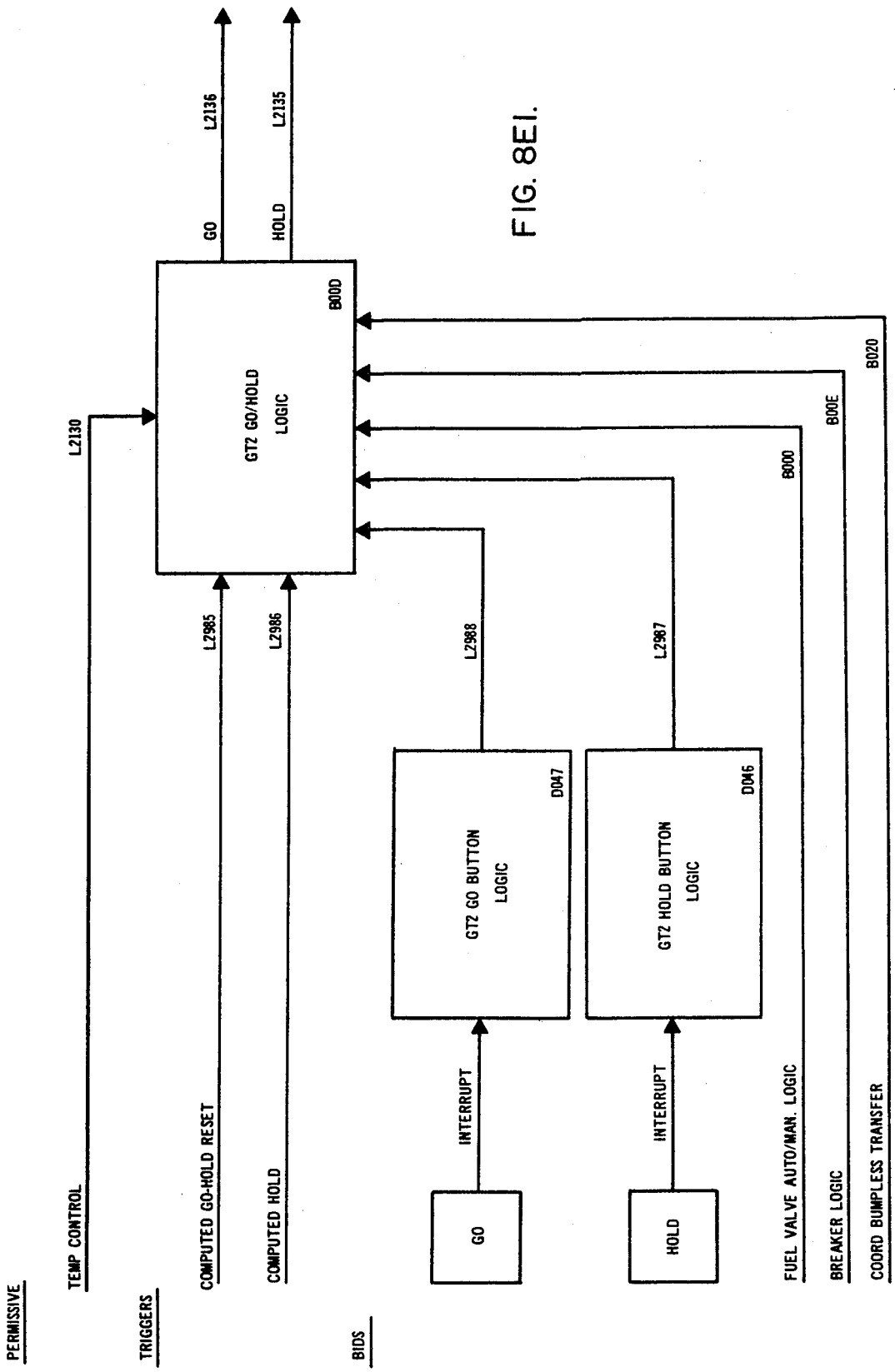
FIGS. 8A–L1 and 2 show functional block diagrams and flow charts for various logic chains employed in the computer.
Figure 8F:
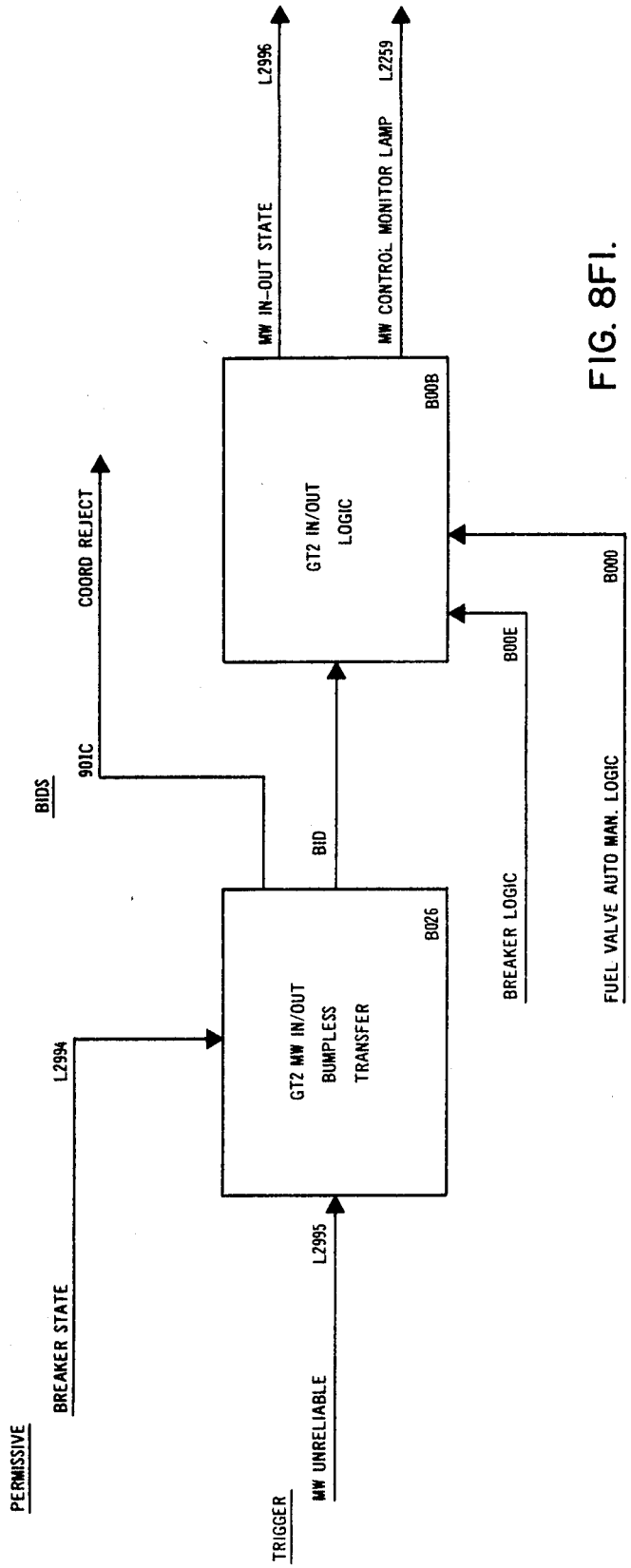

| INDEX OF VARIABLES FOR DRAWINGS | | |
|---|---|---|
| FIG. 8B2 | | |
| | V2993 | OPERATOR LOAD DEMAND |
| | L2976 | MANUAL FUEL VALVE |
| | L2121 | COORD LAMP |
| | L2994 | BREAKER FLIPFLOP |
| | L2129 | MW CONTROL BUTTON/LAMP |
| | L2985 | COMPUTED GO/HOLD RESET |
| | L2986 | COMPUTED HOLD |
| | L2015 | PEAK BUTTON C1 |
| | L2125 | MIN LOAD LAMP |
| | L2980 | MIN LOAD BUTTON PUSHED |
| | K2965 | PEAK MW |
| | K2964 | BASE MW |
| FIG. 8C2 | | |
| | L2992 | SURGE/SPEED RUNBACK |
| | L2990 | BPT RUNBACK |
| | L2994 | BREAKER FLIPFLOP |
| | B00C | FLAME LOGIC |
| | B00A | AUTO SYNC LOGIC |
| FIG. 8D2 | | |
| | L2996 | MW FLIPFLOP |
| | L2995 | MW UNRELIABLE |
| | L2994 | BREAKER FLIPFLOP |
| | L2976 | MANUAL FUEL VALVE |
| | L2259 | MW CONTROL MONITOR LAMP |
| FIG. 8E2 | | |
| | L2938 | GO BUTTON PUSHED |
| | L2987 | HOLD BUTTON PUSHED |
| | L2986 | COMPUTED HOLD |
| | L2985 | COMPUTED GO-HOLD RESET |
| | L2136 | GO LAMP |
| | L2135 | HOLD LAMP |
| | L2976 | MANUAL FUEL VALVE |
| | L2994 | BREAKER FLIPFLOP |
| | L2121 | COORD LAMP |
| | L2130 | TEMP CONTROL BUTTON/LAMP |
| FIG. 8F2 | | |

Figure 8G:
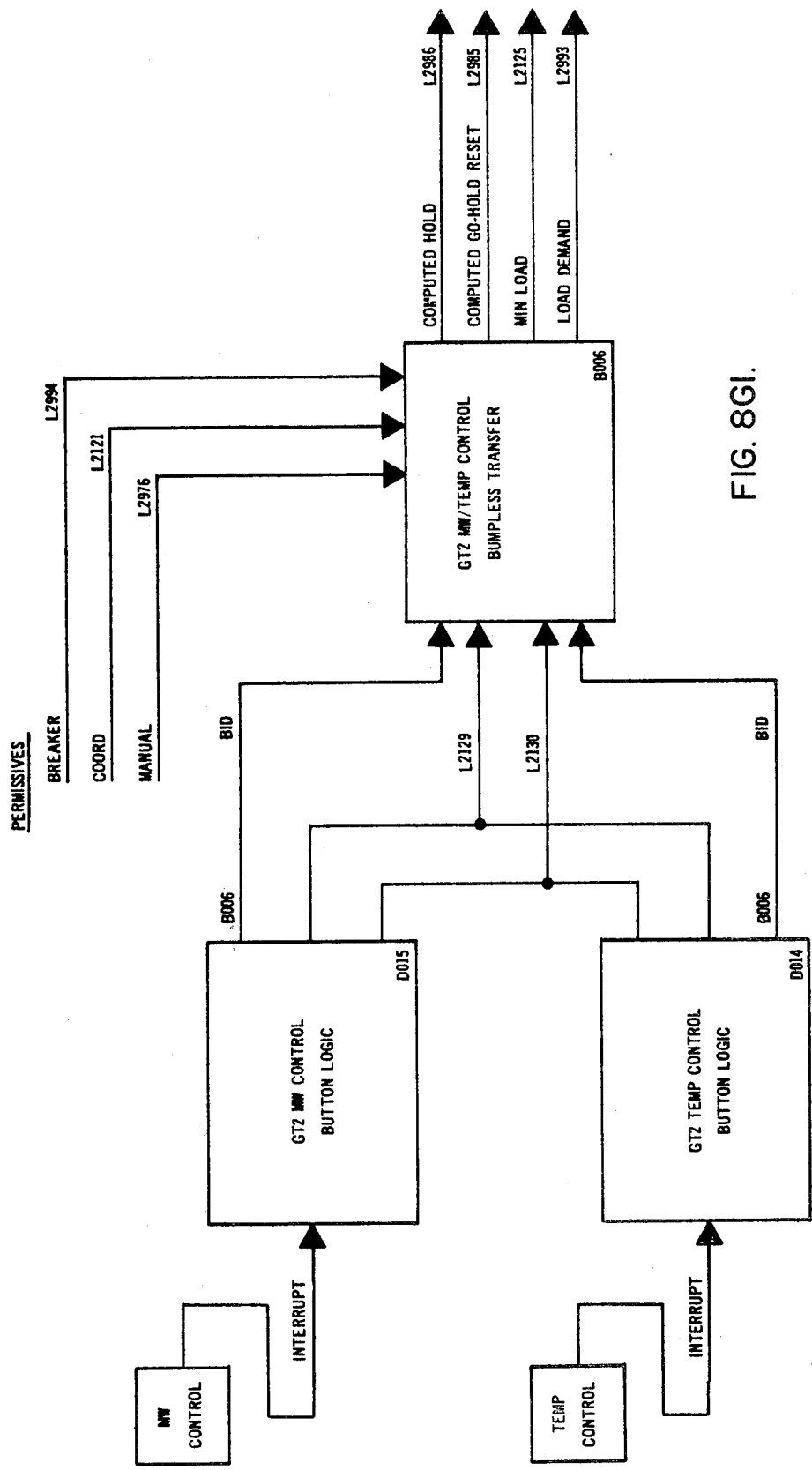
Figure 8H:
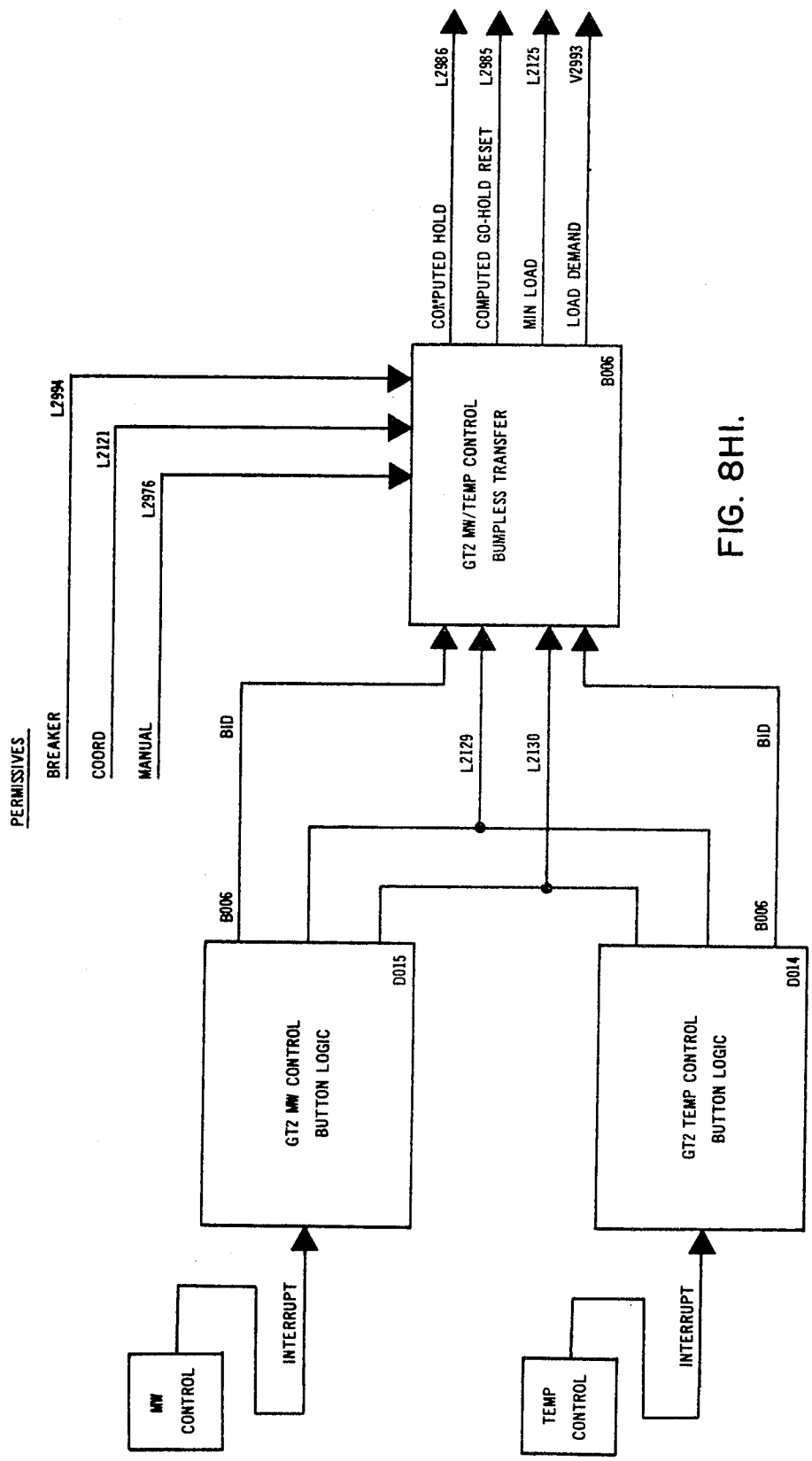
Figure 8J:
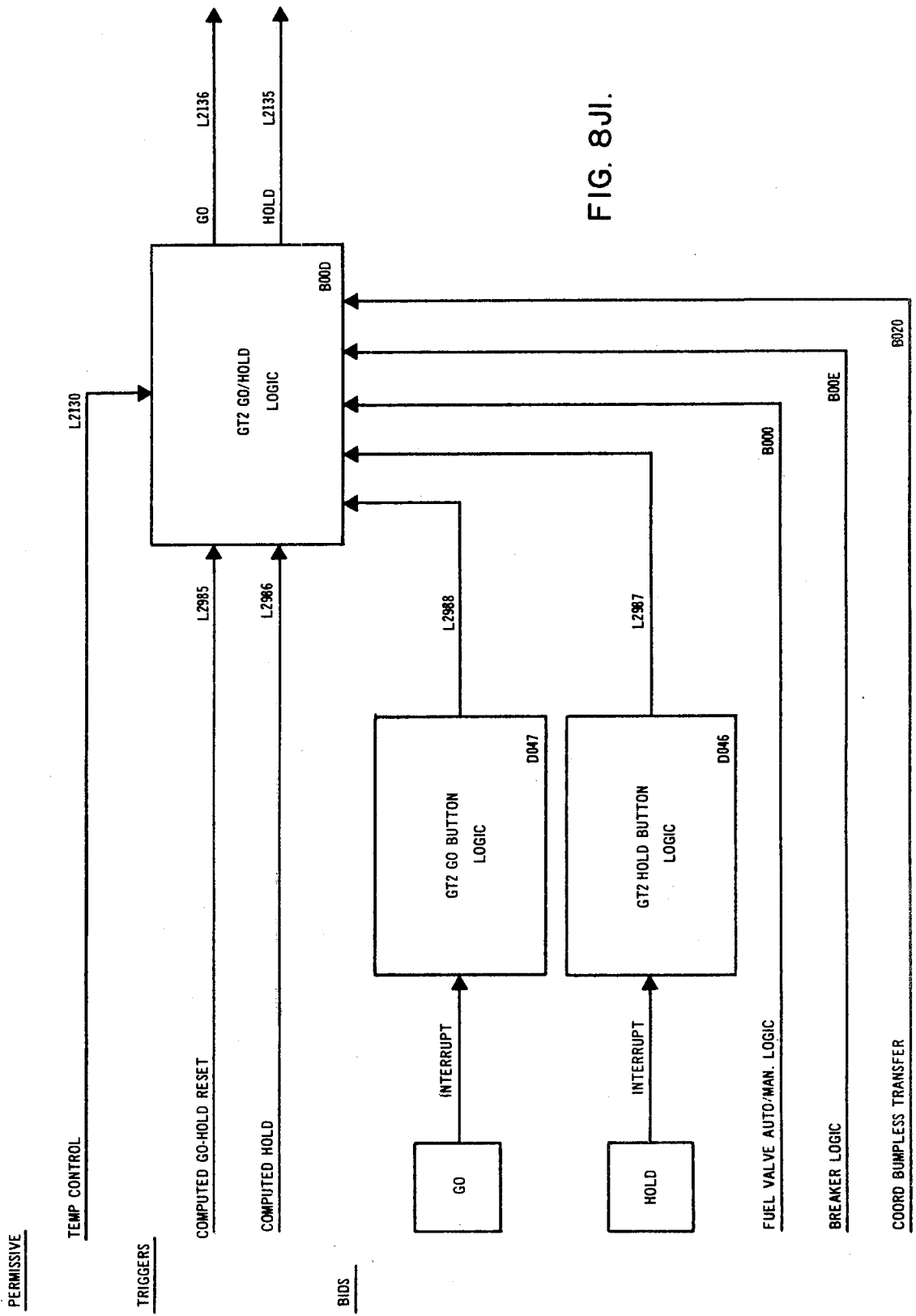

| INDEX OF VARIABLES FOR DRAWINGS -continued | | |
|---|---|---|
| | V2993 | OPERATOR LOAD DEMAND |
| | V2992 | REFERENCE |
| | V2990 | MW CONTROLLER TOTAL OUTPUT |
| | V2989 | MW CONTROLLER INTEGRAL OUTPUT |
| | V2988 | MW CONTROLLER LAST INPUT |
| | V2104 | GENERATOR MW |
| | L2994 | BREAKER FLIPFLOP |
| | L2995 | MW UNRELIABLE |
| | B008 | MW IN/OUT LOGIC |
| | 801C | MW UNRELIABLE COORD REJECT |
| FIG. 8G2 | | |
| | L2129 | MW CONTROL BUTTON/LAMP |
| | L2130 | TEMP CONTROL BUTTON/LAMP |
| | L2132 | BASE LIMIT |
| | L2133 | PEAK LIMIT |
| | B006 | MW/TEMP CONTROL BUMPLESS TRANSFER |
| FIG. 8H2 | | |
| | L2129 | MW CONTROL BUTTON/LAMP |
| | L2130 | TEMP CONTROL BUTTON/LAMP |
| | L2132 | BASE LIMIT |
| | L2133 | PEAK LIMIT |
| | L2968 | AUTO STOP |
| | B006 | MW/TEMP CONTROL BUMPLESS TRANSFER |
| FIG. 8I2 | | |
| | L2980 | MIN LOAD BUTTON PUSHED |
| FIG. 8J2 | | |
| | L2987 | HOLD BUTTON PUSHED |
| | L2976 | MANUAL FUEL VALVE |
| | L2121 | COORD LAMP |
| | L2994 | BREAKER FLIPFLOP |
| | L2130 | TEMP CONTROL BUTTON/LAMP |
| | B00D | GO/HOLD LOGIC |
| FIG. 8K2 | | |
| | L2988 | GO BUTTON PUSHED |
| | L2987 | HOLD BUTTON PUSHED |
| | L2976 | MANUAL FUEL VALVE |
| | L2121 | COORD LAMP |
| | L2994 | BREAKER FLIPFLOP |
| | L2130 | TEMP CONTROL BUTTON/LAMP |
| | B00D | GO/HOLD LOGIC |
| FIG. 8L2 | | |
| | V2993 | OPERATOR LOAD DEMAND |
| | L2121 | COORD LAMP |
| | L2976 | MANUAL FUEL VALVE |
| | L2994 | BREAKER FLIPFLOP |
| | L2129 | MW CONTROL BUTTON/LAMP |
| | L2014 | BASE BUTTON C1 |
| | L2015 | PEAK BUTTON C1 |
| | K2964 | BASE MW |
| | K2965 | PEAK MW |
| FIG. 9A2 | | |
| | V2992 | REFERENCE |
| | V2990 | MW CONTROLLER TOTAL OUTPUT |
| | V2974 | SPEED FUEL REFERENCE |
| | V2104 | GENERATOR MW |
| | V2973 | LOAD FUEL REFERENCE |
| | V2976 | FUEL VALVE SET POINT |
| | V2988 | MW CONTROLLER LAST INPUT |
| | V2989 | MW CONTROLLER INTEGRAL OUTPUT |
| | V2065 | SPEED CONTROLLER OUTPUT |
| | V2064 | SURGE CONTROLLER OUTPUT |
| | V2987 | SELECTED SPEED |
| | V2955 | SPEED CONTROLLER TOTAL OUTPUT |
| | V2954 | SPEED CONTROLLER INTEGRAL OUTPUT |
| | V2953 | SPEED CONTROLLER LAST INPUT |
| | L2994 | BREAKER FLIPFLOP |
| | L2966 | MW FLIPFLOP |
| | L2992 | SURGE/SPEED RUNBACK |
| | L2986 | COMPUTED HOLD |
| | L2135 | HOLD LAMP |
| | L6010 | MIN LOAD LAMP |
| | L6011 | BASE LAMP |
| | L6012 | PEAK LAMP |
| | L2977 | ANALOG SURGE/SPEED UNRELIABLE |
| | K2988 | OUTPUT RANGING GAIN-SPEED |
| | K2987 | OUTPUT RANGING GAIN-LOAD |
| | K2950 | MW CONTROLLER ARRAY |
| | K2990 | SURGE/SPEED RUNBACK DEADBAND |
| | K2991 | MINIMUM LOAD |

-continued

Figure 9B:
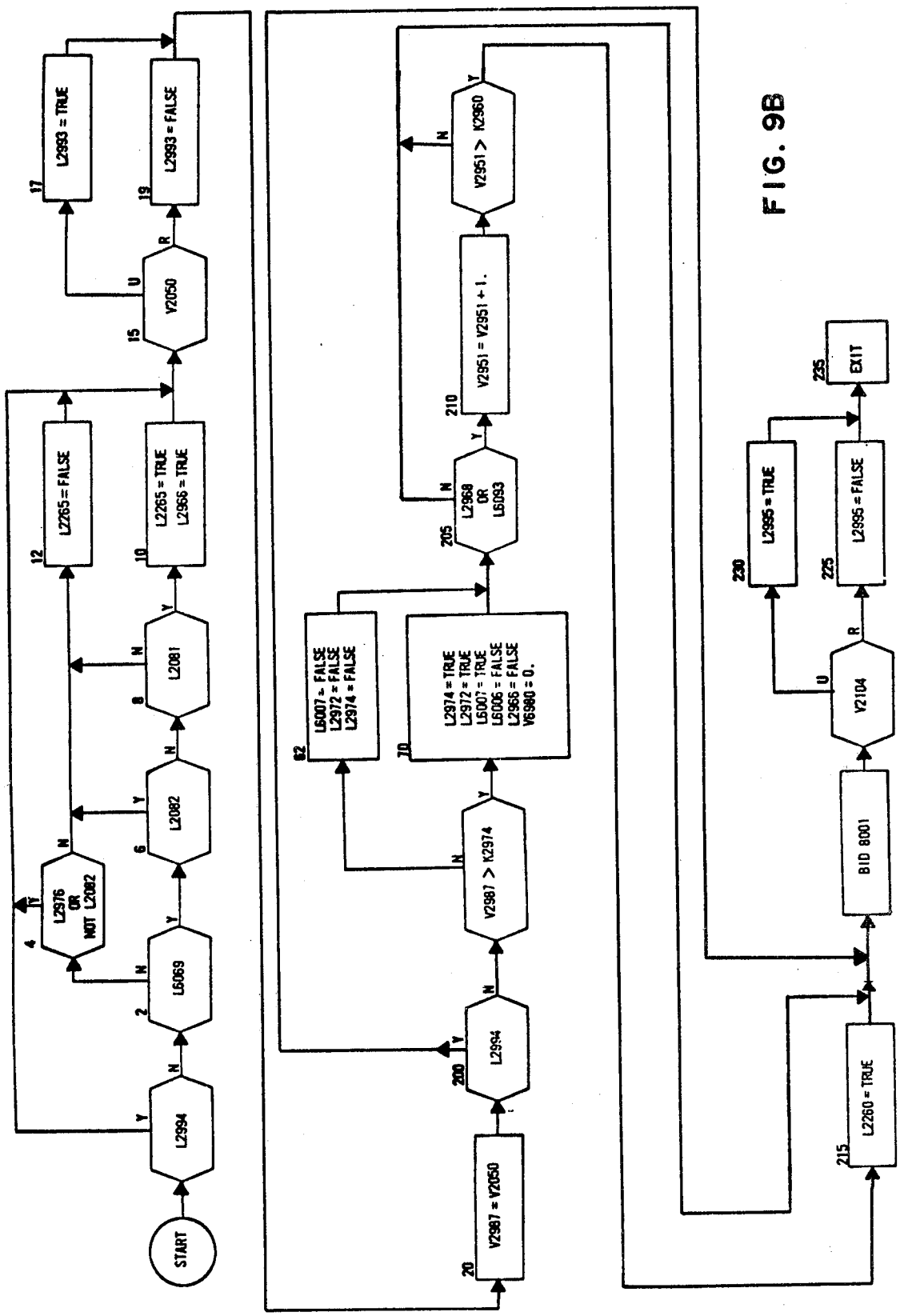
Figure 9C:
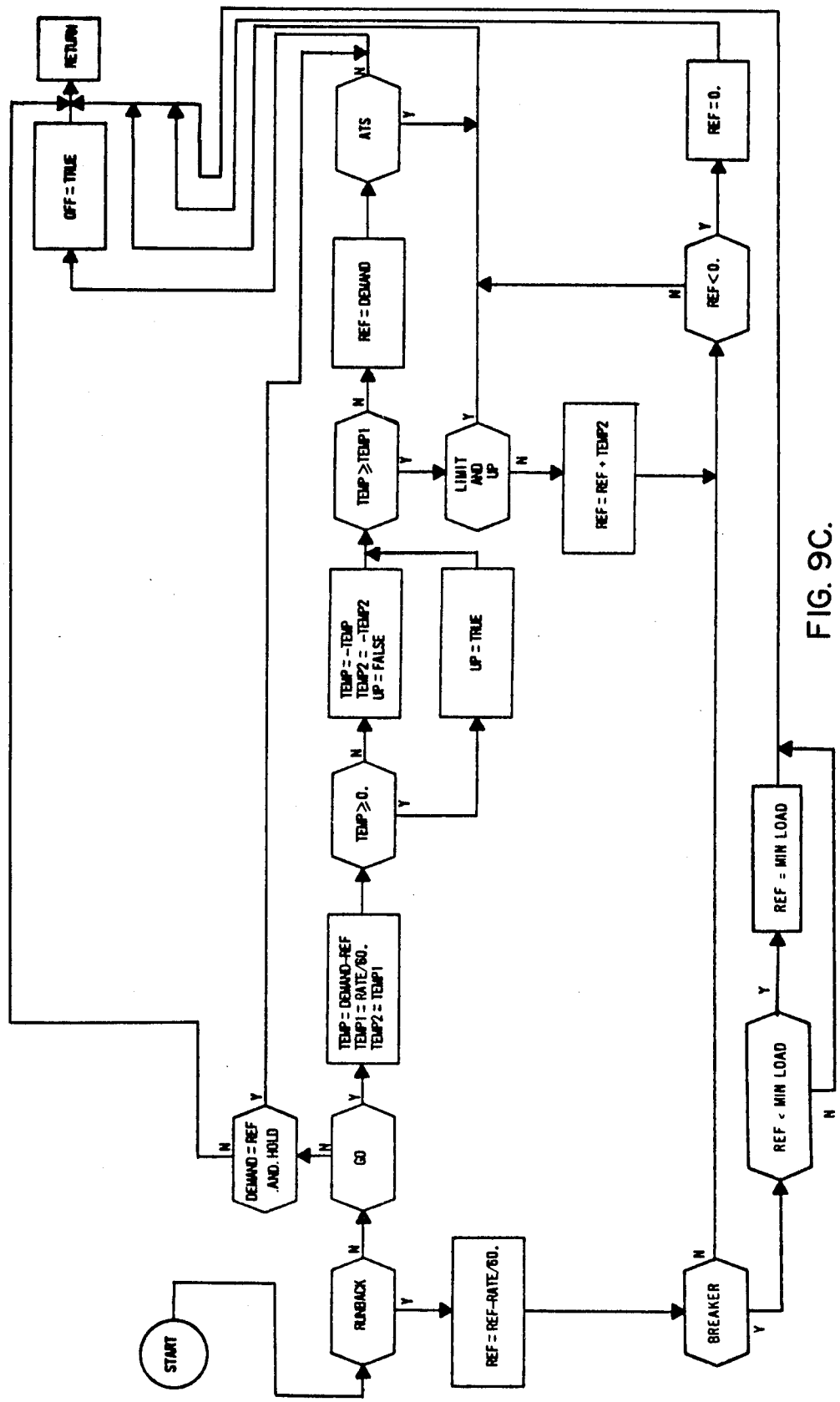
Figure 9D:
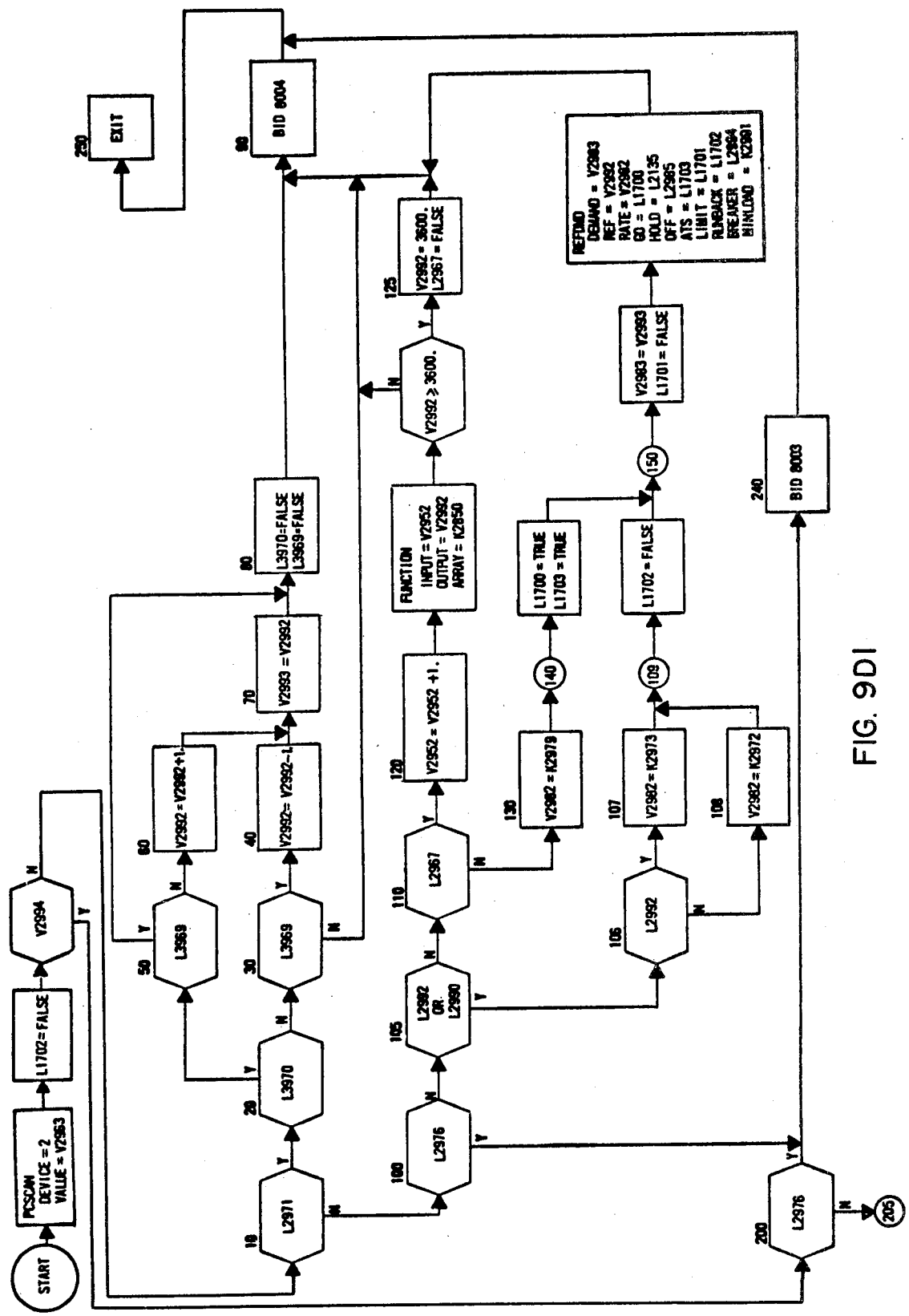

| | INDEX OF VARIABLES FOR DRAWINGS |
|---|---|
| K2920 | SPEED CONTROLLER ARRAY |
| K2964 | BASE MW |
| K2997 | INITIAL FUEL VALVE POSITION |
| 8002 | READY/OUTPUT |
| FIG. 9B | |
| V1050 | SPEED |
| V1987 | SELECTED SPEED |
| V1951 | STOP COUNTER |
| V6981 | START TIMER |
| V1104 | GENERATOR MW |
| L1994 | BREAKER FLIPFLOP |
| L1972 | REQUEST FOR AUTO SYNC |
| L6059 | SYNC SPEED LAMP |
| L1974 | REQUEST FOR MANUAL SYNC |
| L6058 | START DEV OFF LAMP |
| L6077 | COORD LAMP |
| L1082 | MASTER 4X RELAY Cl |
| L1081 | HOT STANDBY Cl |
| L1256 | STAT CO |
| L1966 | AUTO START |
| L1976 | MANUAL FUEL VALVE |
| L1260 | STOP |
| L1968 | AUTO STOP CO |
| L6093 | NORMAL STOP LAMP |
| L1993 | SPEED UNRELIABLE |
| L1995 | MW UNRELIABLE |
| K1974 | SYNC SPEED |
| K1960 | MAX. STOP COUNT |
| 8009 | (BP-EXHAUST) TEMPERATURE CONTROL |

What is claimed is:

1. A gas turbine electric power plant comprising a compressor section and a turbine section, a plurality of combustors for energizing the driving gas flow for the turbine section, means for generating electric power under the driving power of the turbine, a gas turbine control system including means for controlling the flow of fuel to the turbine combustors, means for generating a fuel reference having one portion thereof corresponding to load demand in units of electrical power generation and having another portion thereof corresponding to the fuel required for idling operation, and means for coupling said fuel reference generating means to said fuel flow controlling means.

2. A gas turbine electric power plant as set forth in claim 1 wherein said fuel reference generating means functions as a feedforward control element in a forward load control channel, means are provided for generating the signal representative of actual generated electrical power, and means are provided for correctively trimming the fuel reference in response to the actual power signal to satisfy the load demand.

3. A gas turbine electric power plant as set forth in claim 1 wherein said control system includes a programmed digital computer, and said computer includes said fuel reference generating means.

4. A gas turbine electric power plant as set forth in claim 1 wherein means are provided for generating a fuel reference during turbine startup, and said load fuel reference generating means includes means for registering the startup fuel reference at idle speed to provide said other portion of the load fuel reference.

5. A gas turbine electric power plant as set forth in claim 4 wherein said fuel reference generating means functions as a feedforward control element in a forward load control channel, means are provided for generating the signal representative of actual generated electrical power, and means are provided for correctively trimming the fuel reference in response to the actual power signal to satisfy the load demand.

6. A gas turbine electric power plant as set forth in claim 1 wherein means are coupled to said fuel reference generating means to cut back or to hold the fuel reference in response to predetermined limit conditions.

7. A gas turbine electric power plant as set forth in claim 4 wherein means are provided for generating a ramp toward a demand value at a controllable rate and means are provided for coupling said ramp generating means to function as a part of said load fuel reference generating means.

8. A gas turbine electric power plant as set forth in claim 4 wherein said fuel reference generating means functions as a feedforward control element in a forward load control channel, means are provided for generating the signal representative of actual generated electrical power, means are provided for correctively trimming the fuel reference in response to the actual power signal to satisfy load demand, and means are provided for adding an output from said trim correcting means with the registered startup fuel reference and the load demand portion of the load fuel reference.

9. A control system for an electric power plant gas turbine comprising means for controlling the flow of fuel to the gas turbine, means for generating a fuel reference having one portion thereof corresponding to load demand in units of electrical power generation having another portion thereof corresponding to the fuel required for idling operation, and means for coupling said fuel reference generating means to said fuel flow controlling means.

10. A control system as set forth in claim 9 wherein said fuel reference generating means functions as a feedforward control element in a forward load control channel, means are provided for generating the signal representative of actual generated electrical power, and means are provided for correctively trimming the fuel reference in response to the actual power signal to satisfy the load demand.

11. A control system as set forth in claim 9 wherein said control system includes a programmed digital computer, and said computer includes said fuel reference generating means.

12. A control system as set forth in claim 9 wherein means are provided for generating a fuel reference during turbine startup, and said load fuel reference generating means includes means for registering the startup fuel reference at idle speed to provide said other portion of the load fuel reference.

13. A control system as set forth in claim 12 wherein said fuel reference generating means functions as a feedforward control element in a forward load control channel, means are provided for generating the signal representative of actual generated electrical power, and means are provided for correctively trimming the fuel reference in response to the actual power signal to satisfy the load demand.

14. A control system as set forth in claim 9 wherein means are coupled to said fuel reference generating means to cut back or to hold the fuel reference in response to predetermined limit conditions.

15. A control system as set forth in claim 12 wherein means are provided for generating a ramp toward a demand value at a controllable rate and means are provided for coupling said ramp generating means to function as a part of said load fuel reference generating means.

16. A control system as set forth in claim 12 wherein said fuel reference generating means functions as a feedforward control element in a forward load control channel, means are provided for generating the signal representative of actual generated electrical power, means are provided for correctively trimming the fuel reference in response to the actual power signal to satisfy the load demand, and means are provided for adding an output from said trim correcting means with the registered startup fuel reference and the load demand portion of the load fuel reference.

17. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbines and said steam generating means, said controlling means including a gas turbine control system having means for controlling the flow of fuel to said gas turbine, means for generating a fuel reference having one portion thereof corresponding to load demand in units of electrical power generation and having another portion thereof corresponding to the fuel required for idling operation, and means for coupling said fuel reference generating means to said fuel flow controlling means.

18. A combined cycle electric power plant as set forth in claim 17 wherein said fuel reference generating means functions as a feedforward control element in a forward load control channel, means are provided for generating the signal representative of actual generated electrical power, and means are provided for correctively trimming the fuel reference in response to the actual power signal to satisfy the load demand.

19. A combined cycle electric power plant as set forth in claim 17 wherein said control system includes a programmed digital computer, and said computer includes said fuel reference generating means.

20. A combined cycle electric power plant as set forth in claim 17 wherein means are provided for generating a fuel reference during turbine startup, and said load fuel reference generating means includes means for registering the startup fuel reference at idle speed to provide said other portion of the load fuel reference.

21. A combined cycle electric power plant as set forth in claim 17 wherein said fuel reference generating means functions as a feedforward control element in a forward load control channel, means are provided for generating the signal representative of actual generated electrical power, and means are provided for correctively trimming the fuel reference in response to the actual power signal to satisfy the load demand.

* * * * *